US012714005B2

(12) United States Patent
Abeles

(10) Patent No.: US 12,714,005 B2
(45) Date of Patent: Aug. 25, 2026

(54) TAPERED SEED PLANTING CLUSTER FOR PENETRATING A HYDROPHOBIC LAYER AFTER A FOREST FIRE

(71) Applicant: VIRIDIS ARBOR LLC, Verona, NJ (US)

(72) Inventor: Gary E. Abeles, Verona, NJ (US)

(73) Assignee: VIRIDIS ARBOR LLC, Verona, NJ (US)

( * ) Notice: Subject to any disclaimer, the term of this patent is extended or adjusted under 35 U.S.C. 154(b) by 0 days.

(21) Appl. No.: 19/531,012

(22) Filed: Feb. 5, 2026

(65) Prior Publication Data

US 2026/0165231 A1 Jun. 18, 2026

Related U.S. Application Data

(63) Continuation-in-part of application No. 19/222,317, filed on May 29, 2025, now Pat. No. 12,568,893, (Continued)

(51) Int. Cl.
*B64D 1/02* (2006.01)
*A01C 7/08* (2006.01)
(Continued)

(52) U.S. Cl.
CPC .............. *A01C 7/085* (2013.01); *A01C 14/00* (2013.01); *A01G 24/40* (2018.02); *B64D 1/02* (2013.01)

(58) Field of Classification Search
CPC .... A01G 9/0291; A01G 9/0295; A01C 14/00; B64D 1/12; B64U 2101/40
See application file for complete search history.

(56) References Cited

U.S. PATENT DOCUMENTS 2,394,192 A * 2/1946 Mann ........................ A01G 9/02 47/1.01 R
4,031,832 A * 6/1977 Edwards .............. A01C 11/006 47/73
(Continued)

FOREIGN PATENT DOCUMENTS

KR 20140068414 A * 6/2014 ........... A01G 9/0293

OTHER PUBLICATIONS

KR-20140068414-A Translation (Year: 2014).*

*Primary Examiner* — Kimberly S Berona
*Assistant Examiner* — Steven J Shur
(74) *Attorney, Agent, or Firm* — Maine Cernota & Curran

(57) ABSTRACT

A seed planting cluster includes a seeding tapered projectile containing seeds, seedlings, and/or saplings, possibly mixed with soil, sand, gravel, fertilizer, and/or SAP granules. The seeding tapered projectile is bonded to at least one hydrating tapered projectile containing water that is released into the ground upon impact, thereby hydrating the seeds, seedlings, and/or saplings. The projectiles are dropped or propelled from an aircraft, thereby inserting them into the ground and penetrating through a hydrophobic layer if present. One or more holes proximate the bottoms of the seeding tapered projectiles to enable rain water and roots to penetrate into soil beneath the hydrophobic layer. A perforated lid can prevent the seeds or seedlings from being ejected from the seeding tapered projectile upon impact with the forest floor. Weighted tips can improve penetration of the tapered projectiles into the forest floor. The seeding and/or hydrating tapered projectiles can biodegradable.

20 Claims, 18 Drawing Sheets

Related U.S. Application Data which is a continuation-in-part of application No. 18/700,343, filed as application No. PCT/US2022/042322 on Sep. 1, 2022.

(60) Provisional application No. 63/272,960, filed on Oct. 28, 2021.

(51) Int. Cl.

| | |
|---|---|
| ***A01C 14/00*** | (2006.01) |
| ***A01G 24/40*** | (2018.01) |

(56) References Cited

U.S. PATENT DOCUMENTS

| | | | | |
|---|---|---|---|---|
| 4,347,686 | A * | 9/1982 | Wood | A01G 9/0291 47/73 |
| 2019/0116719 | A1* | 4/2019 | Fletcher | B64D 1/16 |

* cited by examiner 302
300
200

402
202
206
204
502
500
404
200

202
206
500
200

616
620
622
802
200
208
204
206
800

1106
1112
1108
1100
1110
1114
102
200

1106
1112
1108
1100
1110
1114
102
200

TAPERED SEED PLANTING CLUSTER FOR PENETRATING A HYDROPHOBIC LAYER AFTER A FOREST FIRE

RELATED APPLICATIONS

This application is a continuation in part of U.S. application Ser. No. 19/222,317, filed on May 29, 2025. Application Ser. No. 19/222,317 is a continuation in part of U.S. application Ser. No. 18/700,343, filed on Apr. 11, 2024. Application Ser. No. 18/700,343 is a national phase application filed under 35 USC § 371 of PCT Application No. PCT/US2022/42322 with an international filing date of Sep. 1, 2022. PCT Application PCT/US2022/42322 claims the benefit of U.S. Provisional Application No. 63/272,960, filed Oct. 28, 2021. All of these applications are incorporated herein by reference in their entirety for all purposes.

FIELD OF THE INVENTION

The invention relates to restoration of a forest after a forest fire, and more particularly, to preventing mudslides and introducing new vegetation into a forest floor after a forest fire.

BACKGROUND OF THE INVENTION

Ecological recovery after a forest fire has always been a challenge, especially in heavily vegetated areas that are unpopulated, or only sparsely populated. Furthermore, recent trends in global climate change have resulted in consistently higher temperatures and persistent droughts in many areas, which in turn have increased the risks and the occurrences of major fires in wilderness and other sparsely populated areas. In particular, fifteen of the largest wildfires that have ever been recorded in the United States have occurred within the past ten years.

With reference to FIG. 1, during intense forest fires, a waxy substance derived from the burning plant material is formed. Initially created as a gas, this substance penetrates into the topsoil and then hardens, creating what is called a "hydrophobic layer" 102 above the underlying layer of normal soil 104. This hydrophobic layer 102 prevents rainwater from sinking into the ground and reaching the underlying soil 104 that would otherwise be able to absorb the water. A thin layer of ash 100 may be formed on top of the hydrophobic layer 102, but is insufficient to absorb rain water falling onto a mountain or other sloping surface after a forest fire, so that the rainwater has no choice but to flow downhill primarily on top of the hydrophobic layer 102, carrying with it the layer of ash 100 and any debris that it may encounter, as well as any normal soil that it flows over. The result is what is commonly referred to as a mudslide.

Often, in the aftermath of a forest fire, an effort is made to stabilize the soil 104 by introducing new ground cover 106 into the area, typically by dropping seeds onto the burned-over ground that will hopefully take root and reduce the likelihood and/or severity of mudslides. However, the roots of the new vegetation 106 have difficulty penetrating through the hard hydrophobic layer 102, which means that, typically, the roots will be mainly on the surface of the ground above the hydrophobic layer 102. The new vegetation 106 will therefore be poorly anchored to the ground, and easily carried away with flowing rainwater, becoming part of a mudslide.

It should be noted that, for ease of expression, the term "forest" is used generically herein to refer to any heavily vegetated area that is a wilderness area, an otherwise unpopulated area, or a sparsely populated area, whether or not the vegetation is primarily trees, and the term "forest fire" is used generically herein to refer to any fire that takes place in such a heavily vegetated area. The terms "trees" and "ground cover" are used herein to refer to any type of vegetation that is relatively large and relatively small, respectively.

What is needed, therefore, is an apparatus and method for increasing absorption of rainwater into soil after a forest fire, and for introducing new ground cover into an area that has experienced a forest fire, such that rainwater runoff will be reduced and the new ground cover will effectively stabilize the soil, thereby reducing the threat of mudslides and consequent erosion of the land.

SUMMARY OF THE INVENTION

The present invention is an apparatus and method for increasing absorption of rainwater into soil below a hydrophobic layer after a forest fire, and for introducing new ground cover into an area that has experienced a forest fire, thereby reducing the threat of mudslides and consequent erosion of the land.

In embodiments, the disclosed apparatus is a seed planting device that comprises a tapered outer shell that surrounds a longitudinal axis of the tapered shell, the cross-section of the tapered shell being larger in area at a proximal end thereof than it is at a distal end thereof. In embodiments, the cross-sectional shape is symmetric about the longitudinal axis. In some embodiments, the distal end of the tapered shell is a point. In embodiments, the tapered shell is polygonal in cross-sectional shape, such that as the seed planting device penetrates through the hydrophobic layer, the polygonal cross-sectional shape of the tapered shell focuses the lateral force applied to the hydrophobic layer into concentrated regions proximate the radially outward extending corners of the tapered shell, thereby fracturing and breaking through the hydrophobic layer with greater efficiency.

One or more seeds, seedlings and/or saplings are included within the disclosed tapered shell. In embodiments, the seeds, seedlings, and/or saplings are included in a seed and soil mixture, which can include any combination of soil, sand, gravel, water, and/or nutrients (i.e. fertilizer). Super-absorbent polymer (SAP) granules can also be included in the seed and soil mixture, so that the germinated vegetation will be better able to survive extended periods of dry weather. In embodiments, the SAP is a non-synthetic, biodegradable, eco-friendly polymer or eco-friendly bio-polymer.

Water can also be included within the tapered shell, so as to increase the weight of the seed planting device and further promote germination and growth of the contained seed(s) and/or seedling(s) and/or saplings. The water can be contained between frangible, water-impermeable barriers within the tapered shell above the seed and soil mixture, and can be configured to fracture upon energetic impact of the seed planting device with the forest floor or other underlying ground, thereby allowing the water to flow downward from the reservoir into the seed and soil mixture.

At least one opening is provided at or near the bottom of the tapered shell through which water can seep and roots can emerge, the holes nevertheless being small enough to prevent significant loss of the seeds, seedlings, saplings, and/or seed and soil mixture before the tapered shell is deployed.

It should be noted that, for ease of expression, the phrase "seed and soil mixture" is used herein to refer to one or more seeds, seedlings, and/or saplings mixed with any combination of other materials, such as sand, gravel, water, super-absorbent polymer (SAP) granules, and/or nutrients (i.e. fertilizer). It should also be noted that term super-absorbent polymer (SAP) is used herein to refer to a polymer that is able to absorb at least 200 times its weight of water. It should further be noted that, unless otherwise required by context, the term "tapered shell" is used herein to refer generically to all embodiments of the disclosed tapered shell, whether the tapered shell is primarily shaped in cross section as a circle, oval, square, triangle, star, or in any other shape. In some embodiments, the cross-sectional shape is constant along the length of the tapered shell, and only changes in size, while in other embodiments the cross-sectional shape of the tapered shell varies along the length of the tapered shell.

In some embodiments of the disclosed method, the seed planting devices are treated as tapered projectiles, wherein in the aftermath of a forest fire a plurality of the tapered projectiles are dropped or propelled onto and into the forest floor from an aircraft, such as a piloted helicopter, a remote-controlled winged aircraft, or a remotely controlled drone. The aircraft can include a global positioning system and/or a wind direction and speed sensor so as to more accurately drop or propel the seed planting devices to the desired locations.

Due to the tapered shape and weight of the seed planting devices, in embodiments they impact the forest floor with sufficient energy to penetrate into the ground through the hydrophobic layer. In some of these embodiments, the impact energy of the tapered shells is entirely derived from gravitational acceleration after the seed planting devices are released from the aircraft, while in other of these embodiments the seed planting devices are energetically propelled from the aircraft, for example by a compressed gas and/or a chemical explosive.

In some embodiments the shell of the tapered projectile is terminated by a weighted and hardened tip that is designed to provide additional weight, energy, and penetrating power to the seed planting device. In some of these embodiments, the tip is designed to be pushed away from the tapered shell by roots of the germinating vegetation and/or to rapidly biodegrade after impact with the forest floor, thereby providing an opening in the bottom of the tapered shell through which water and roots can penetrate.

In some embodiments the tapered projectile is a "seeding" tapered projectile that is included in a cluster together with one or more "hydrating" tapered projectiles, wherein the hydrating tapered projectiles are filled primarily with water, either as a liquid and/or incorporated into a super-absorbent polymer (SAP). The seeding and hydrating tapered projectiles in the cluster can be directly attached to each other, or attached together by "struts" which reduce the air resistance of the cluster.

The hydrating tapered projectiles in these embodiments do not carry soil, seeds, or seedlings, but may carry fertilizer, either dissolved in the water or separately. Upon impact, all of the tapered projectiles penetrate into the ground and, if present, through the hydrophobic layer. Water is then released from the hydrating tapered projectiles, thereby providing moisture for the one or more seeds, seedlings, and/or saplings within the seeding tapered projectile to grow and extend roots into the ground. This approach ensures that the seeds, seedlings, and/or saplings are able to grow and stabilize the ground even during periods of low rainfall, so that mudslides are less likely to result from any heavy and sudden rainfalls that subsequently occur.

In other embodiments, the seed planting devices are pressed into the soil by personnel on the ground. In some of these embodiments, a plurality of the seed planting devices are mounted to a tray, such that the tapered shells extend below the tray. The tray can then be placed on the ground and the tapered shells can be simultaneously pressed onto the soil, for example by stepping on the tray. The tray can be configured to release the seed planting devices when the tray is lifted from the ground after the seed planting devices have been deployed.

In various other embodiments, a seed planting assembly comprises a plurality of tapered shells mounted such that they all extend downward from a common frame, while the tops of the tapered shells extend to openings through the common frame. In some of these embodiments, the individual tapered shells do not contain seeds, seedlings, and/or saplings. Instead, a single seed, seedling, and/or sapling, or a plurality of seeds, seedlings and/or saplings, are included in a soil mixture provided in an upper compartment that extends upward from the frame. In embodiments, the weight of the seed planting assembly is sufficient to cause all of the tapered shells to penetrate through the hydrophobic layer when dropped from an aircraft, due to gravity and/or ballistic propulsion. Some of these embodiments enable larger plants to be established, such as saplings that are intended to replace the burned trees of the forest, because the roots of the plant can extend simultaneously through all of the plurality of tapered shells, thereby establishing a larger root system than might be possible for a plant that is germinated within a single seed planting device. In some of these devices, hydrating tapered projectiles as described above are included in the seed planting assembly, in addition to, or instead of, tapered shells containing soil mixtures.

As a result of the penetration of the seed planting assemblies into the soil, holes are "punched" by the tapered shells and/or hydrating tapered projectiles through the hydrophobic layer, thereby allowing water contained in the hydrating tapered projectiles (if present) to be released into the underlying soil, and providing a path for rainwater to seep into the tapered shells (if present) and through the openings near the bottom of the tapered shells into the water-absorbent soil that is beneath the hydrophobic layer.

Furthermore, upon germination of the seeds and/or maturation of the seedlings or saplings within each tapered shell or upper chamber, the roots of the new ground cover grow out through the openings near the bottom of the one or more tapered shells (if present) and/or hydrating tapered projectiles (if present) and into the soil that is beneath the hydrophobic layer, thereby anchoring the new foliage to the underlying soil so that it cannot be easily washed away by flowing surface water or mud.

In embodiments, the disclosed seed planting device, or the upper chamber of the disclosed seed planting assembly, includes a perforated or porous lid or screen that is fixed in position above the contained soil mixture. For example, the lid can be a wire mesh or a porous fabric such as burlap or coir. The openings in the lid are small enough to prevent any significant quantity of the seed and soil mixture from being ejected through the lid upon impact of the seed planting device with the forest floor, while being large enough to allow rainwater to pass through the lid. As the new ground cover germinates and grows, it either passes through the openings in the lid, or it bursts through the lid, if the lid is made from a frangible material such as a perforated sheet of cellulose.

The lid can be fixed to the tapered shell of a seed planting device by any attachment means known in the art, including by an adhesive, by fasteners such as rivets or screws, by press-fit, and/or by tabs that extend into indentations provided in the tapered shell. In some embodiments the lid is spaced above the upper surface of the seed and soil mixture, and thereby provides partial shade to newly germinated seedlings or saplings until they have grown sufficiently to pierce or pass through the lid.

In embodiments, the hydrating tapered projectiles, tapered shells, and/or lids are made from one or more biodegradable materials, such as from AshCrete™ (a concrete alternative comprising a mixture of fly ash, borate, bottom ash, and a chlorine compound), hempcrete clay, Timbercrete™ (a masonry product containing a blend of cellulose, cement, sand, and binders), bamboo, recycled wood, coir, and/or other recycled materials, so that after the danger of mudslides has abated and the new vegetation has been established, the hydrating tapered projectiles, tapered shells, and/or lids biodegrade and blend into the soil.

A first general aspect of the present invention is a seed planting cluster comprising a hollow seeding tapered projectile having a top, a bottom, and a side, the seeding tapered projectile comprising a tapered shell extending downward along a vertical length thereof from a proximal top to a distal bottom, wherein a horizontal, cross-sectional area of the top is larger than a horizontal, cross-sectional area of the bottom, at least one seeding hole penetrating the tapered shell proximate the bottom thereof, one or more seeds, seedlings, and/or saplings contained within the tapered shell, a hollow hydrating tapered projectile fixed to the seeding tapered projectile, a horizontal, cross-sectional area of a top of the hydrating tapered projectile being larger than a horizontal, cross-sectional area of a bottom of the hydrating tapered projectile, hydrating water contained within the hydrating tapered projectile, and at least one hydrating hole proximate a bottom of the hydrating tapered projectile, each of the hydrating holes being covered by a water-soluble or frangible hydrating hole cover. The seed planting cluster is configured such that, upon an impact of the seed planting cluster with underlying ground, the bottoms of the seeding and hydrating tapered projectiles are inserted into the underlying ground, each of the hydrating holes is dissolved or ruptured, the hydrating water is released into the underlying ground, and the seeds, seedlings, and/or saplings are exposed to the hydrating water, thereby causing the seeds, seedlings, and/or saplings to extend roots into soil beneath the seeding tapered projectile.

In embodiments, the hydrating tapered projectile can be directly bonded to the seeding tapered projectile, or bonded to the seeding tapered projectile by at least one strut.

In any of the above embodiments, the hydrating tapered projectile can further contains fertilizer.

In any of the above embodiments, at least some of the hydrating water that is contained within the hydrating tapered projectile can be absorbed into a super-absorbent polymer (SAP).

In any of the above embodiments, the hydrating hole cover can include gelatin.

In any of the above embodiments, the hydrating tapered projectile can be included in a plurality of hydrating tapered projectiles, the seeding tapered projectile being centrally located among the plurality of hydrating tapered projectiles.

In any of the above embodiments, the seeding tapered projectile can further include a porous or perforated lid fixed within the tapered shell above said one or more seeds, seedlings, and/or saplings.

In any of the above embodiments, the seeding tapered projectile can further include a water-filled reservoir contained between frangible, water impermeable barriers and located within the tapered shell above the one or more seeds, seedlings, and/or saplings, the water impermeable barriers being configured to fracture upon energetic impact of the seeding tapered projectile with a forest floor, thereby allowing the water from the reservoir to flow downward from the reservoir to the one or more seeds, seedlings, and/or saplings.

In any of the above embodiments, the bottom of the tapered shell of the seeding tapered projectile can terminates in a point, or the bottom of the tapered shell of the seeding tapered projectile can terminates in one of the seeding holes.

In any of the above embodiments, at least one of the seeding holes can penetrate a side of the tapered shell of the seeding tapered projectile proximate the bottom thereof.

In any of the above embodiments, the tapered shell of the seeding tapered projectile can further include a weighted and pointed tip. In some of these embodiments, the weighted and pointed tip is configured to be pushed away from the bottom of the tapered shell by roots growing downward from new vegetation arising from the seeds, seedlings, and/or saplings, thereby leaving an opening in the bottom of the tapered shell. In other of these embodiments, the weighted and pointed tip is configured to dissolve or otherwise biodegrade after the impact of the seed planting cluster with underlying ground.

In any of the above embodiments, at least one of the seeding tapered projectile and the hydrating tapered projectile can be biodegradable.

A second general aspect of the present invention is a method of planting vegetation in a forest floor after a forest fire that has created a hydrophobic layer on the forest floor. The method includes providing a plurality of seed planting clusters according to the first general aspect; and dropping or propelling the plurality of seed planting clusters from an aircraft onto the forest floor, such that, upon impact of the seed planting clusters with the forest floor, the bottoms of the seeding and hydrating tapered projectiles are inserted into underlying ground of the forest floor, the hydrating holes are uncovered, the hydrating water is released into the underlying ground, and the seeds, seedlings, and/or saplings are exposed to the hydrating water, thereby causing the seeds, seedlings, and/or saplings to extend roots into the underlying ground.

In embodiments, the aircraft is one of a piloted helicopter, a remotely controlled winged aircraft, and a remotely controlled hovering drone.

And in any of the above embodiments, the impact energy of the seed planting clusters can be derived entirely from gravitational acceleration after being released from the aircraft, or the seed planting clusters can be ballistically propelled from the aircraft toward the forest floor.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for increasing absorption of rainwater into soil below a hydrophobic layer of a forest floor after a forest fire, and for introducing new ground cover into an area that has experienced a forest fire, thereby reducing the threat of mudslides and consequent erosion of the land.

Figure 1:
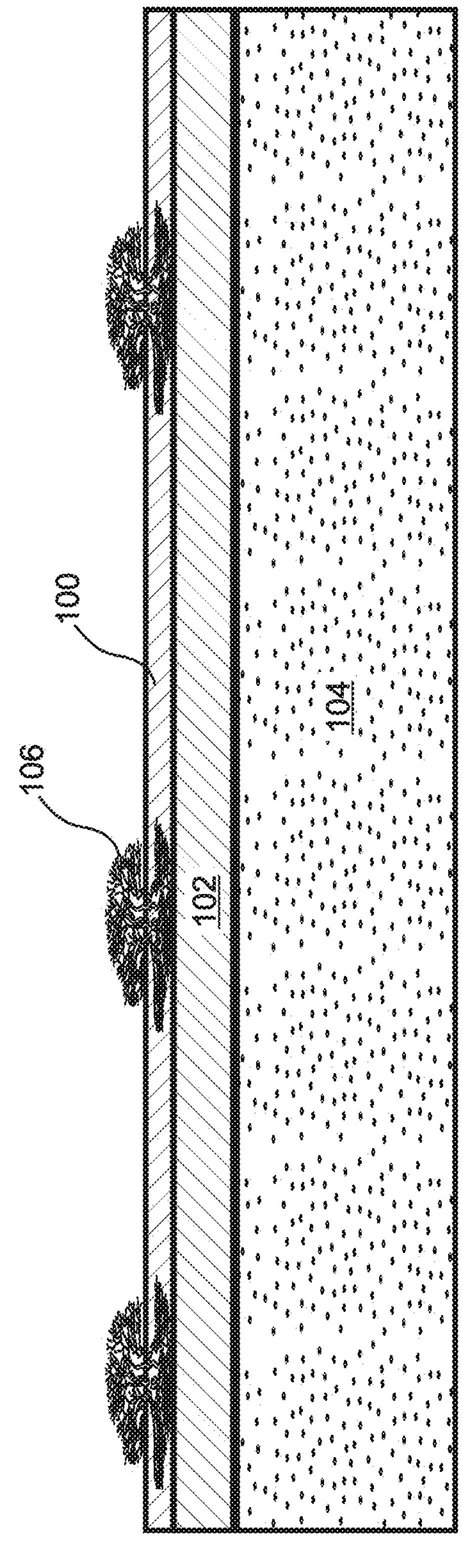
FIG. 1 is a cross section indicating a prior art method of introducing vegetation into a forest after a fire.
Figure 2A:
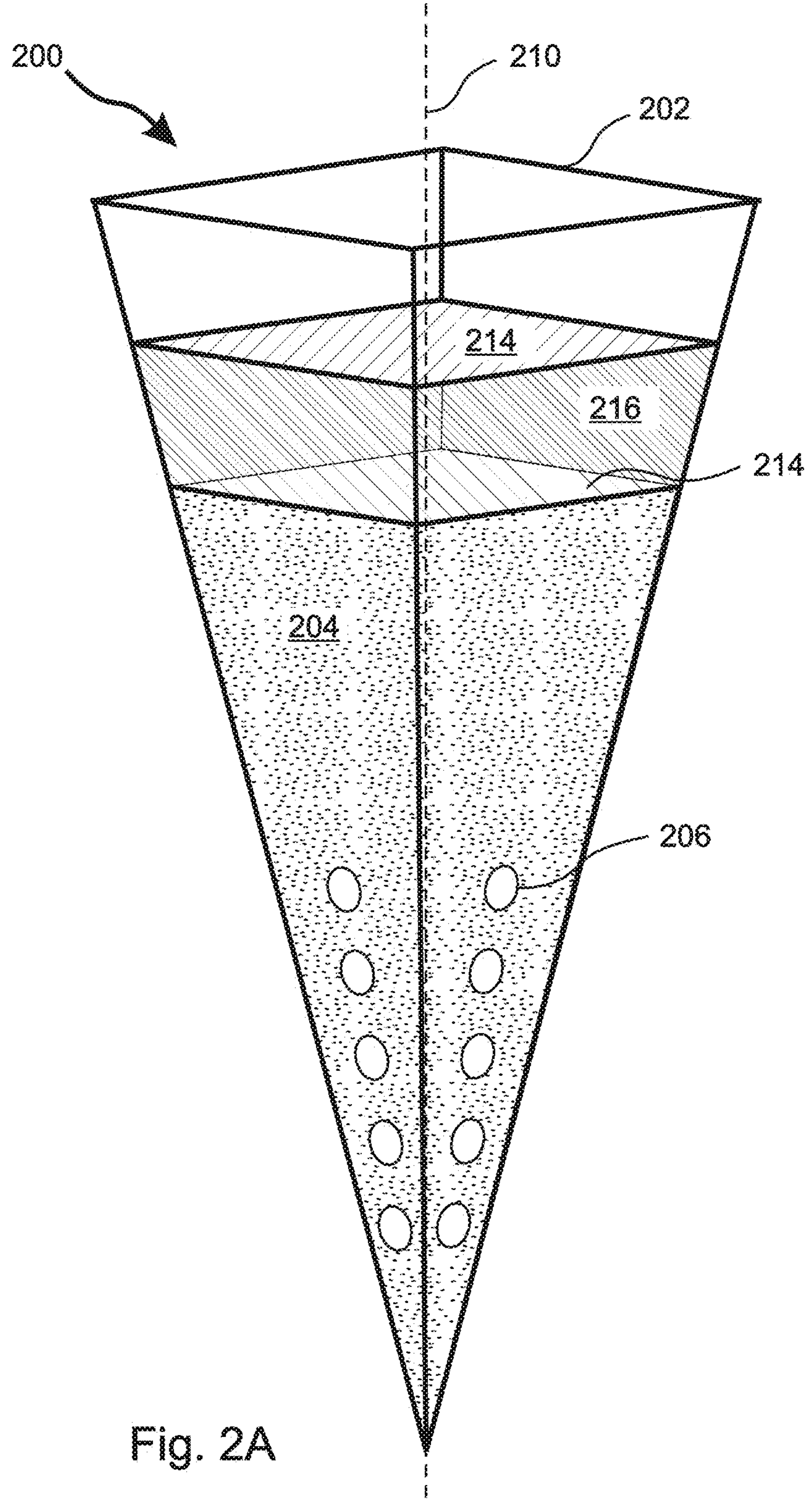
FIG. 2A is a perspective view of a seed planting device having a square cross section in an embodiment of the present invention.
Figure 2C:
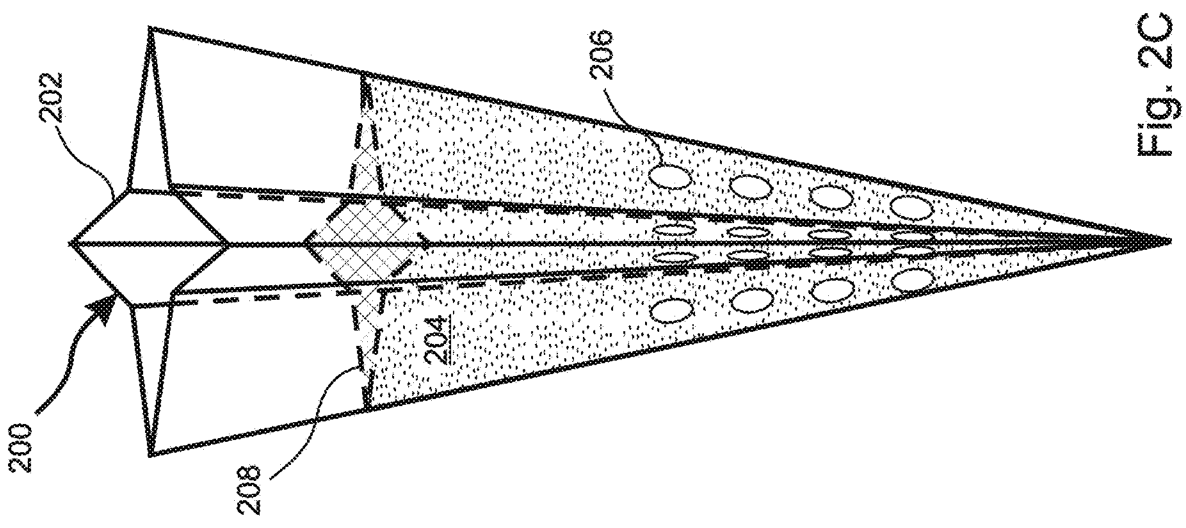
FIG. 2C is a transparent perspective view of the seed planting device of FIG. 2B.
Figure 2B:
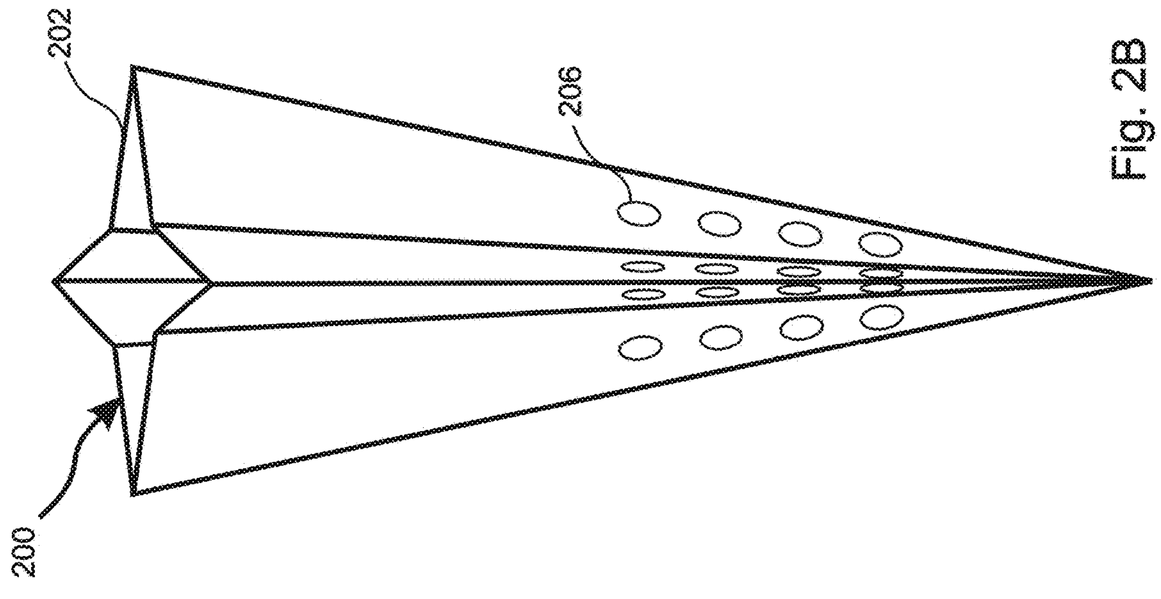
FIG. 2B is an opaque perspective view of a seed planting device having a four-pointed star-shaped cross section in an embodiment of the present invention.

With reference to FIGS. 2A-2C, the disclosed seed planting device 200 comprises a pointed or otherwise tapered outer shell 202 having a cross-section that surrounds a longitudinal axis 210 of the tapered shell 202. The cross-sectional area of the tapered shell 202 is largest at a proximal end thereof than it is at a distal end thereof. In the illustrated embodiments of FIGS. 2A-2C, the cross-sectional shape is symmetric about the longitudinal axis 210, and tapers to a point. It can be seen in the drawings that the tapered shell 202 extends vertically downward along a length thereof from the proximal top to the distal bottom, and that the horizontal cross-sectional shape of the tapered shell 202 is uniform in shape along the vertical length of the tapered shell 202, but monotonically reduced in area from the proximal top to the distal bottom. It can be further seen that the seed planting device does not extend horizontally or vertically beyond the tapered shell.

For ease of expression, the phrase "seed and soil mixture," or simply "soil mixture," 204 is used herein generically to refer to one or more seeds, seedlings, and/or saplings, combined with any mixture of one or more materials such as sand, gravel, super absorbent polymer (SAP) granules, and/or soil. Similarly, the term "tapered shell" is used herein generically and irrespective of the cross-sectional shape of the tapered shell 202, unless otherwise required by context.

In the embodiment of FIG. 2A, the cross-sectional shape of the tapered shell 202 is square, such that the tapered shell 202 is shaped as a downward pointing quadrilateral pyramid. In the embodiment of FIGS. 2B and 2C, the cross-section of the tapered shell 202 is shaped as a star. In the illustrated embodiments, at least one opening 206 is provided at or near the distal end of the tapered shell 202 through which water can seep into the tapered shell 202, while being small enough to prevent significant loss of the seed and soil mixture 204. In FIG. 2A the tapered shell 202 is shown as if it were transparent, so that its contents can be viewed. FIGS. 2B and 2C are respective opaque and transparent views of the illustrated embodiment.

The embodiment of FIG. 2A further includes a reservoir filled with water 216 located between two water-impermeable frangible barriers 214. The barriers 214 are configured to confine the water 216 before deployment of the seed planting device 200, and to rupture upon impact of the seed planting device 200 with the ground, so that the water 216 can flow into the seed and soil mixture 204, and so that water from any subsequent rainfall can enter and flow through the seed planting device 200.

In the embodiments of FIGS. 2B-2C, the seed planting device 200 includes a perforated or porous lid or screen 208, such as a wire screen or porous fabric, that is fixed within the interior of the tapered shell 202 and located above the contained seed and soil mixture 204. The openings in the lid 208 are small enough to prevent any significant amount of the seed and soil mixture 204 from being ejected through the top of the tapered shell 202 upon impact with the forest floor 300, while being large enough to allow water to pass through the lid 208 and into the tapered shell 202.

The porous lid 208 can be made from a frangible material, such as a sheet of cellulose, such that germinating and growing plant life can burst upward through the lid, or the holes in the lid 208 can be large enough to allow the stems or branches to pass through. In some embodiments the lid 208 is spaced above the upper surface of the seed and soil mixture 204, and thereby provides partial shade to newly germinated seedlings or saplings as they extend above the seed and soil mixture 204 within the tapered shell 202 until the seedlings have grown sufficiently to pierce or pass through the lid.

The lid 208 can be fixed to the tapered shell 202 by any attachment means known in the art, including by an adhesive, by a fastener such as a rivet or screw, by press-fit, or by tabs that extend from the lid into indentations provided in the tapered shell 202. In some embodiments, the lid 208 is perforated only in a central region thereof, for example in cases where the tapered shell 202 is relatively large as compared to the seedling or sapling that will emerge after germination. A larger tapered shell 202 might be implemented, for example, to increase the weight and perforating power of the seed planting device 200.

Figures 2D, 2E, 2F, 2G, 2H:
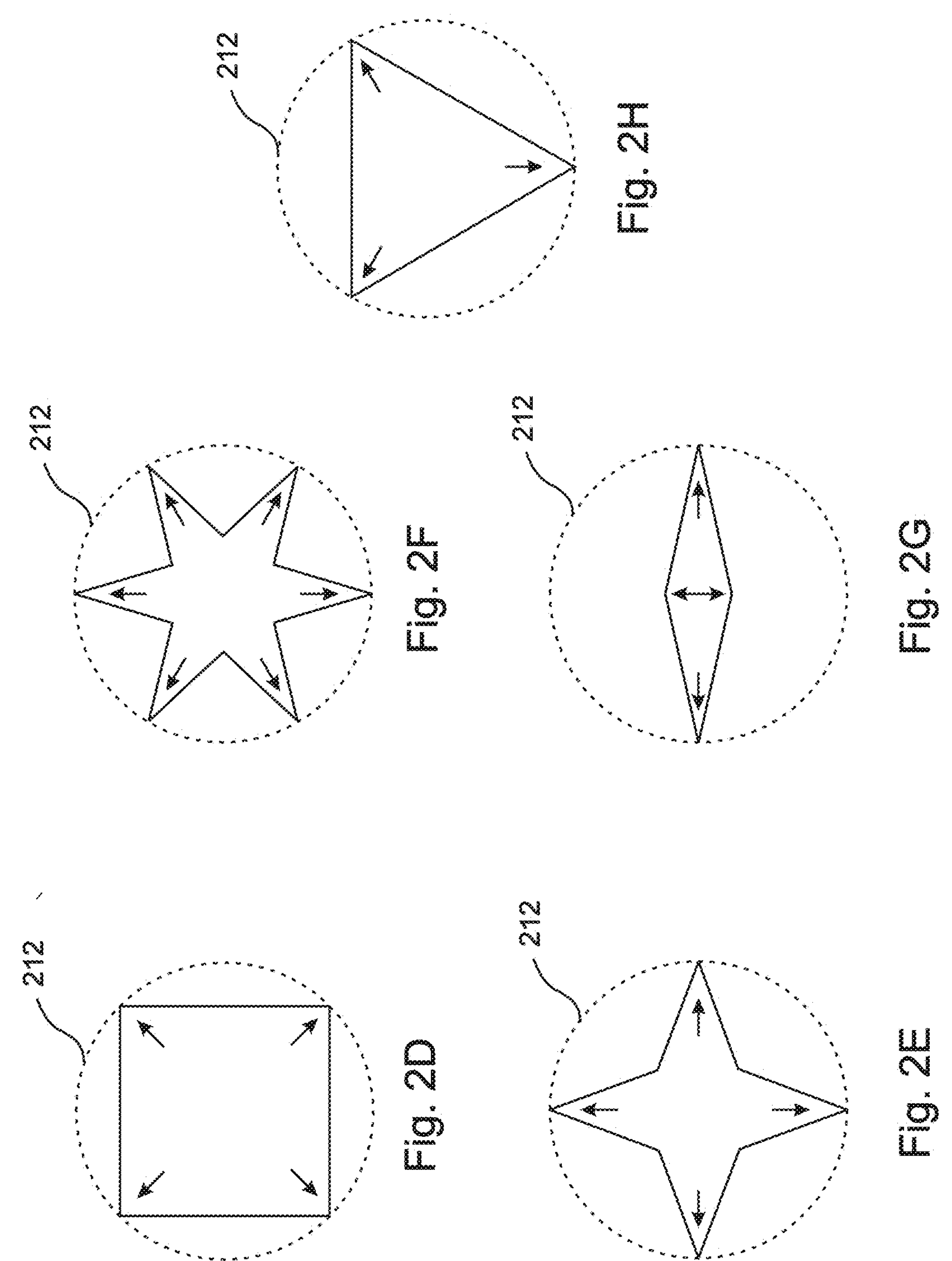
FIG. 2D is a cross-sectional view of an embodiment of the present invention having a square shape in cross section.
FIG. 2E is a cross-sectional view of an embodiment of the present invention having a four-pointed star shape in cross section.
FIG. 2F is a cross-sectional view of an embodiment of the present invention having a six-pointed star shape in cross section.
FIG. 2G is a cross-sectional view of an embodiment of the present invention having a diamond shape in cross section.
FIG. 2H is a cross-sectional view of an embodiment of the present invention having a triangular shape in cross section.

FIGS. 2D-2H are cross sections of the tapered shells 202 of various embodiments of the invention. In FIG. 2D, the cross-section is square, and corresponds with the embodiment of FIG. 2A. In FIG. 2E, the cross-section is star-shaped, and corresponds with the embodiment of FIGS. 2B-2C. FIG. 2F is a cross section of an embodiment having a star-shaped cross section with more "points" than FIG. 2E. FIG. 2G is a cross section of an embodiment having a cross section shaped as a flattened square or diamond, and FIG. 2H is a cross section of an embodiment having a triangular cross section, such that the tapered shell 202 is shaped as a downward-pointing triangular pyramid.

In each of FIGS. 2D-2H, the cross-sectional shape is shown for comparison as being circumscribed within a circle 212, which would be the cross section of a downward pointing cone. While a tapered cone maximizes the internal volume of the seed planting device 200, it can be seen in the figures that as the cone penetrated downward, it would apply outward (horizontal) forces to the hydrophobic layer uniformly in all directions. In contrast, the cross sectional shapes of FIGS. 2D-2H focus the lateral force applied to the hydrophobic layer into concentrated regions proximate the radially outward extending corners or "points" of the tapered shell 202 cross section, as is indicated by the radially outward facing arrows in the drawings, thereby fracturing and breaking through the hydrophobic layer with greater efficiency.

Figure 2I:
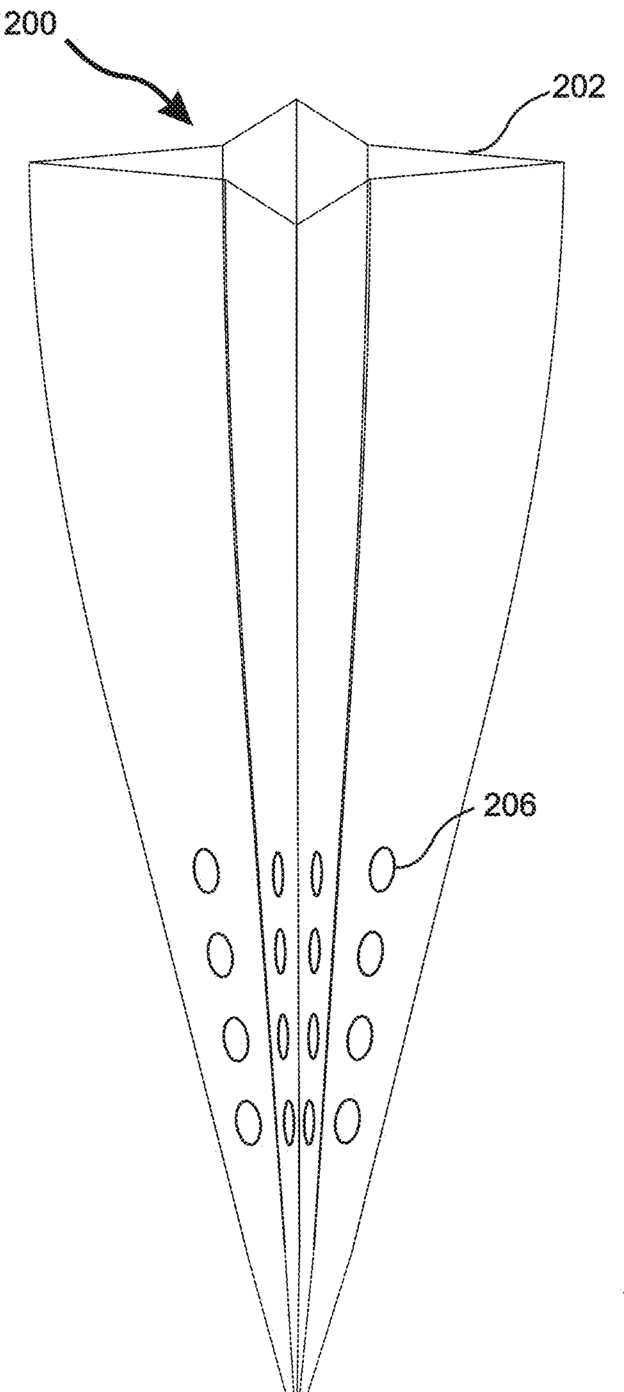
FIG. 2I is an opaque, perspective view of an embodiment similar to FIG. 2A, but wherein the tapering of the cross-section is not uniform over the length of the tapered shell.

FIG. 2I is a perspective view of an embodiment that is similar to FIG. 2B, but in which tapering of the cross-section is not uniform over the length of the tapered shell 202. According to this approach, the sharply pointed distal portion provides optimal penetrating power, while the more gradually tapered proximal portion provides an enhanced containment volume for the seed and soil mixture 204.

Figure 3:
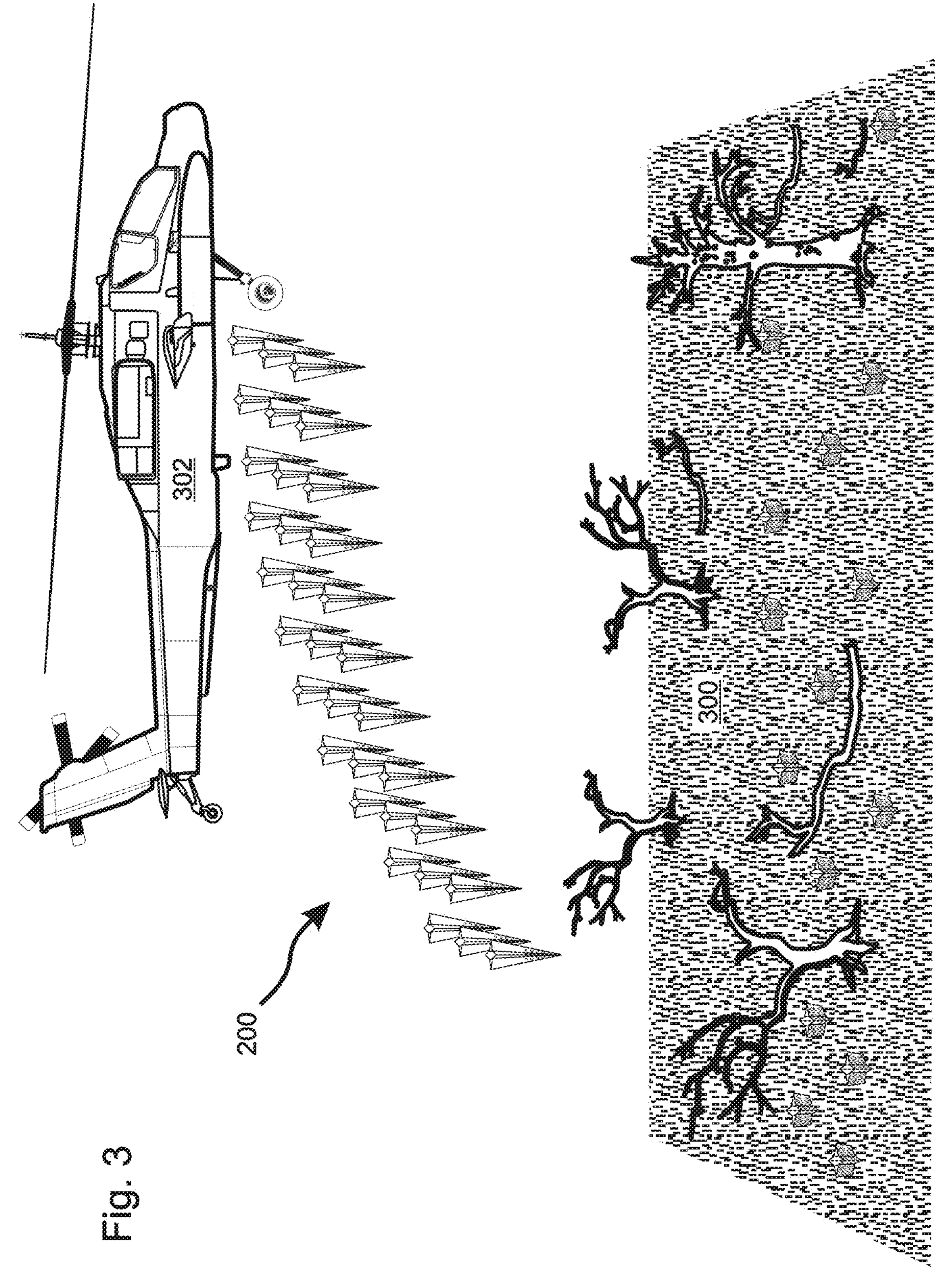
FIG. 3 illustrates dropping of a plurality of the seed planting devices of FIG. 2B onto a forest floor after a fire.

With reference to FIG. 3, in embodiments of the disclosed method, after a forest fire a plurality of the seed planting devices 200 are treated as seeding tapered projectiles, in that they are dropped or propelled onto and into the forest floor 300 from an aircraft 302. The aircraft 302 can include a global positioning system and/or a wind direction and speed sensor so as to more accurately drop or propel the seeding tapered projectiles 200 to the desired locations. In the embodiment of FIG. 3, the seeding tapered projectiles 200 are dropped from a piloted helicopter 302. In other embodiments, the aircraft can be a remote-controlled winged aircraft or a remotely controlled drone.

Figure 4A:
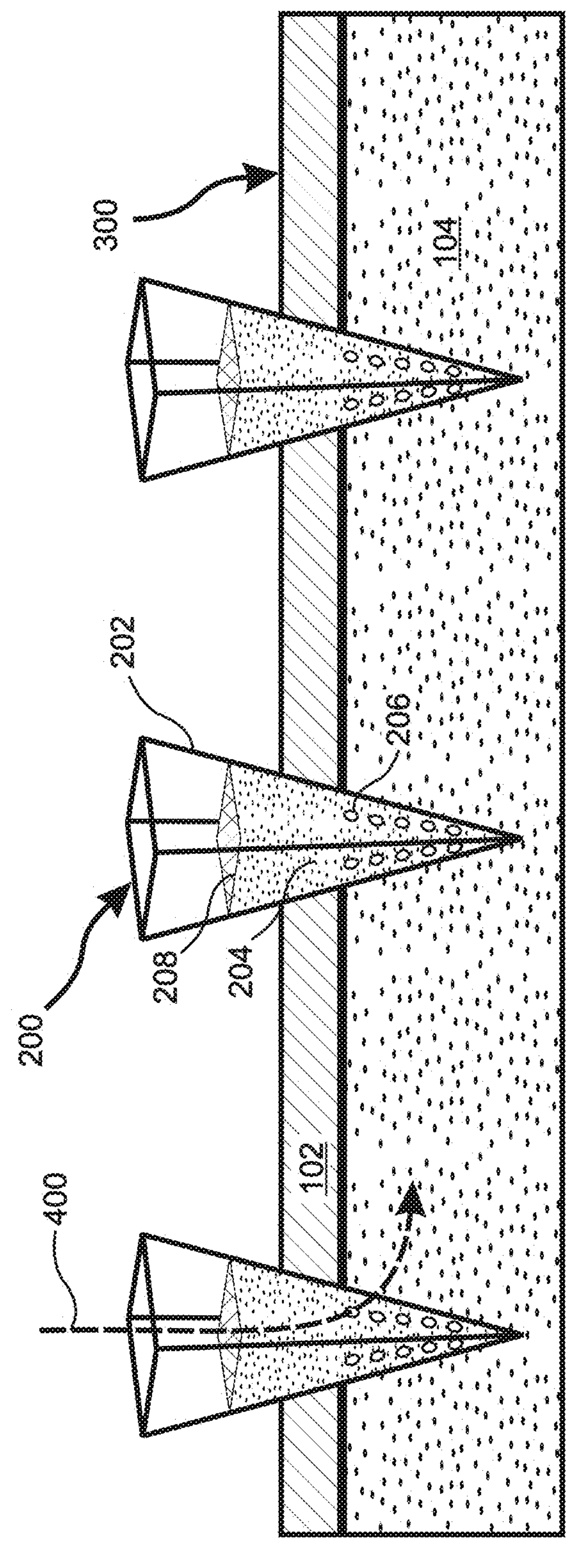
FIG. 4A is a cross-sectional view illustrating penetration of the seed planting devices of FIG. 2A into the forest floor.

With reference to FIG. 4A, which is directed to the embodiment of FIG. 2A, the shape and weight of the seeding tapered projectiles 200 causes them to impact the forest floor 300 with sufficient energy to penetrate into the ground through the hydrophobic layer 102, thereby allowing rainwater to seep into and through the tapered shells 202, and out through the openings 206 near the bottoms of the tapered shells 202 into the underlying soil 104, as is indicated 400 in the drawing. As a result, rainwater is less likely to pool on top of the hydrophobic layer 102, and is thereby less likely to cause downhill floods and mudslides. In some of these embodiments, the impact energy of the seeding tapered projectiles 200 is derived entirely from gravitational acceleration, while in other of these embodiments the seeding tapered projectiles 200 are energetically propelled toward the forest floor 300, for example by a compressed gas or a chemical explosive.

Figure 4B:
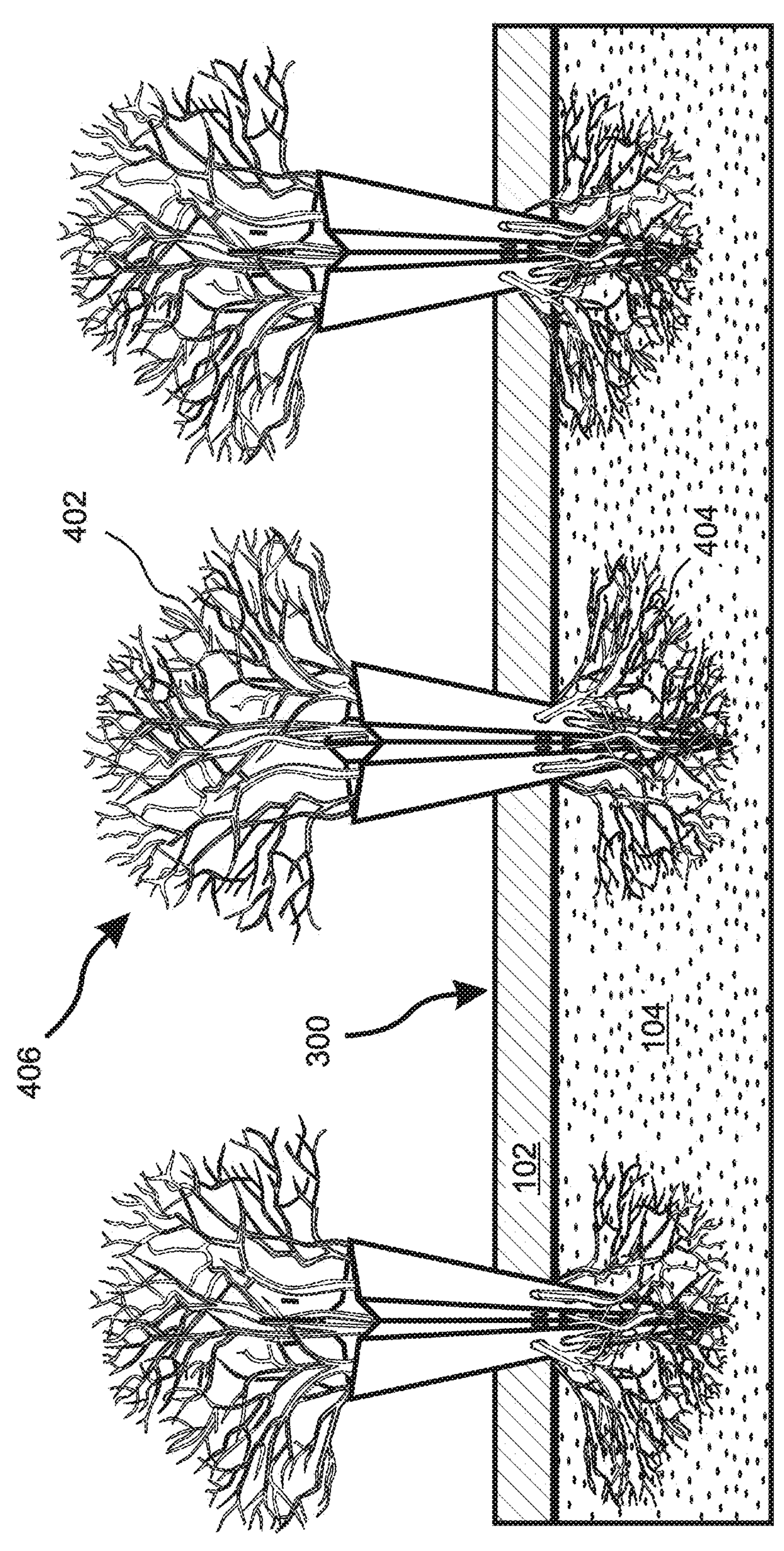
FIG. 4B illustrates the growth of vegetation and the penetration of roots into the soil below the hydrophobic layer that arises from germination and/or growth of the seeds, seedlings, and/or saplings delivered by the seed planting devices of FIG. 2B.

With reference to FIG. 4B, which is directed to the embodiment of FIGS. 2B and 2C, upon germination of the seeds, and/or growth of the seedlings and/or saplings within the tapered shell 202, the roots 404 of the new ground cover 406 grow out through the openings 206 provided at or near the bottom of the tapered shell 202 and into the soil 104 that is beneath the hydrophobic layer 102, thereby anchoring the new vegetation 402 to the underlying soil layer 104, and further reducing the threat of mudslides.

Figure 5B:
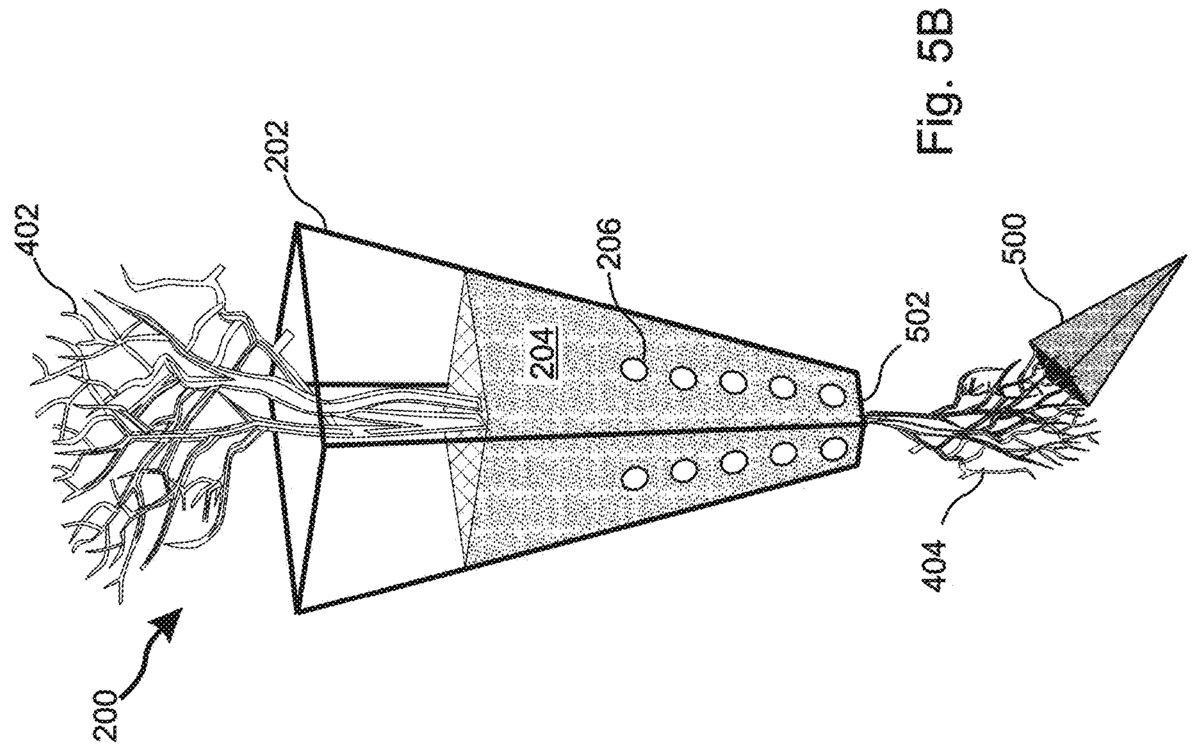
FIG. 5B is a perspective view of the seed planting device of FIG. 5A, shown after deployment of the seed planting device, wherein sprouted roots have pushed the weighted tip away from the remainder of the tapered shell.
Figure 5A:
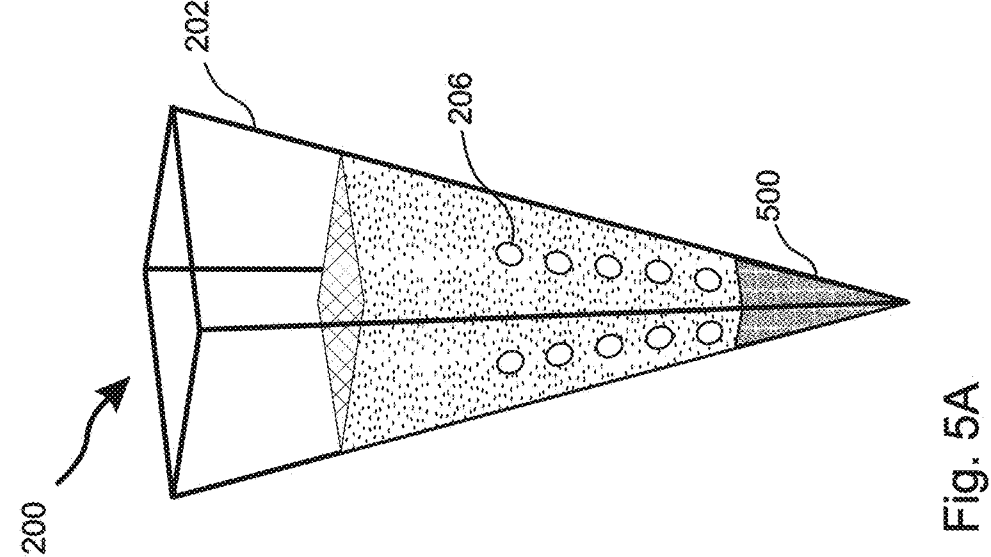
FIG. 5A is a perspective view of a seed planting device similar to FIG. 2A, but including a weighted tip at the bottom thereof, the seed planting device being shown before deployment thereof.

With reference to FIG. 5A, in some embodiments the tapered shell 202 is terminated by a weighted and hardened tip 500 that provides additional weight, energy, and penetrating power to the seed planting device 200. With reference to FIG. 5B, in some of these embodiments, the weighted tip 500 is designed to be pushed away from the tapered shell 202 by the growing roots 404 of the new vegetation 402. In other embodiments the weighted tip 500 is configured to rapidly biodegrade after impact with the forest floor 300, thereby providing an opening 502 in the bottom of the tapered shell 202 through which water and roots 404 can penetrate.

Figure 6:
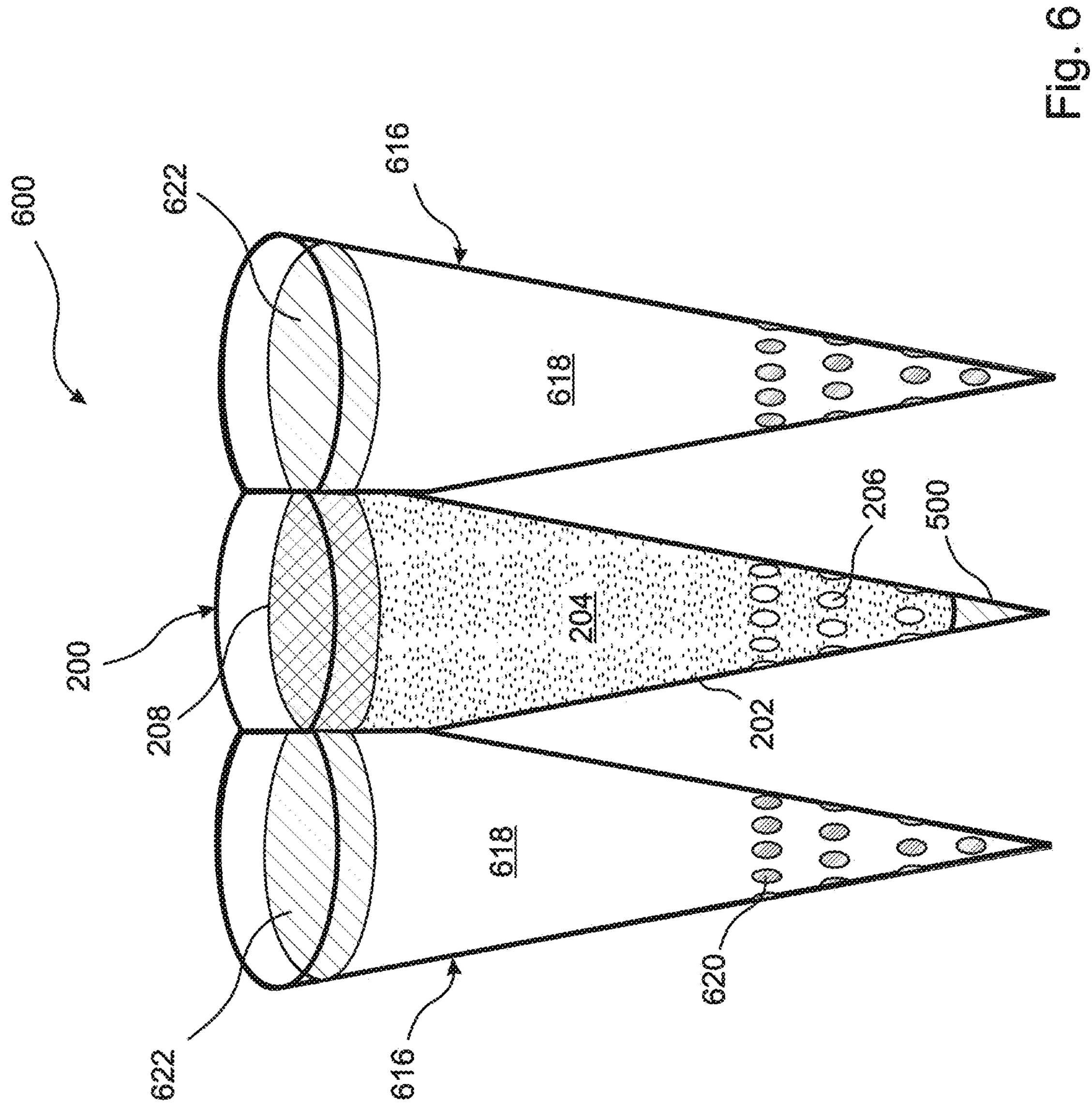
FIG. 6 is a side perspective view of a seeding cluster that comprises a seeding tapered projectile directly bonded and symmetrically located between two hydrating tapered projectiles according to an embodiment of the present invention.

With reference to FIG. 6, in embodiments the seeding device is a tapered "seeding" projectile 200 that is included in a cluster 600 together with one or more tapered "hydrating tapered projectiles 616, wherein each of the hydrating tapered projectiles 616 is filled primarily with water 618, either as a liquid, as shown in FIG. 6, and/or incorporated into a super-absorbent polymer (SAP) that is carried by the hydrating tapered projectile 616.

The hydrating tapered projectiles 616 do not carry soil, seeds, or seedlings, but may carry fertilizer, either dissolved in the water 618 or separately. Upon impact, all of the tapered projectiles 200, 616 penetrate into the ground 102, 104 including, if present, through the hydrophobic layer 102. Water 618 is then released from the one or more hydrating tapered projectiles 616, thereby providing moisture for the one or more seeds, seedlings, and/or saplings within the seeding tapered projectile 20. This approach ensures that the seeds, seedlings, and/or saplings 204 are able to germinate and stabilize the ground even during periods of low rainfall, so that mudslides are less likely to result from any heavy and sudden rainfalls that subsequently occur.

In the embodiment of FIG. 6 the seeding tapered projectile 202 is sandwiched between two hydrating tapered projectiles 616. The hydrating tapered projectiles 616 in this embodiment contain liquid water 618. Hydrating holes 620 are provided proximate the tips of the hydrating tapered projectiles 616. Before deployment of the cluster 600, the hydrating holes 620 are sealed by a water-soluble or frangible cover, which, for example, can be a layer of gelatin. The tops of the hydrating tapered projectiles 616 are sealed by water-impermeable covers 622.

Figure 7A:
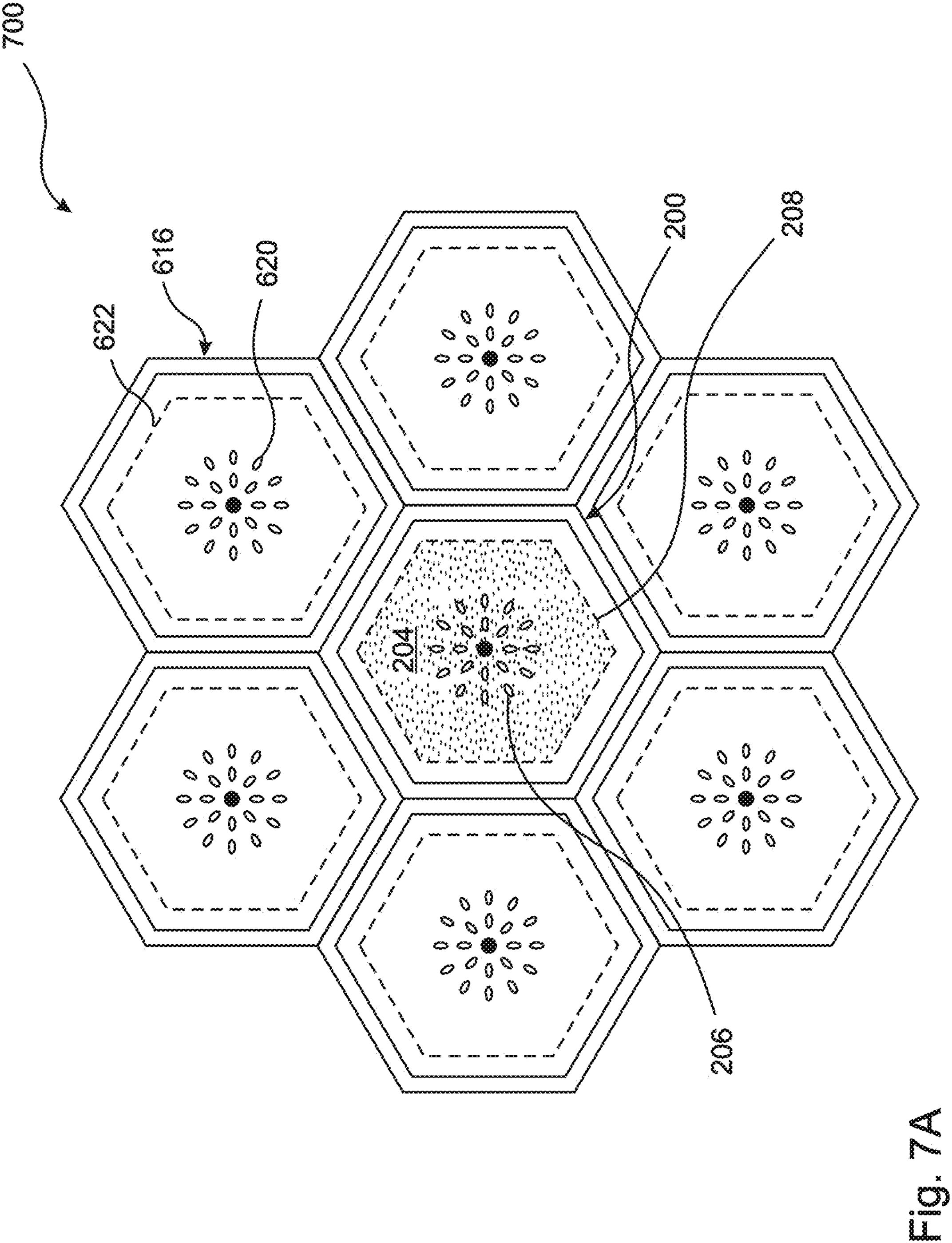
FIG. 7A is a top view of a seeding cluster that comprises a central hexagonal seeding tapered projectile bonded to and symmetrically surrounded by six hexagonal hydrating tapered projectiles according to an embodiment of the present invention.
Figure 7B:
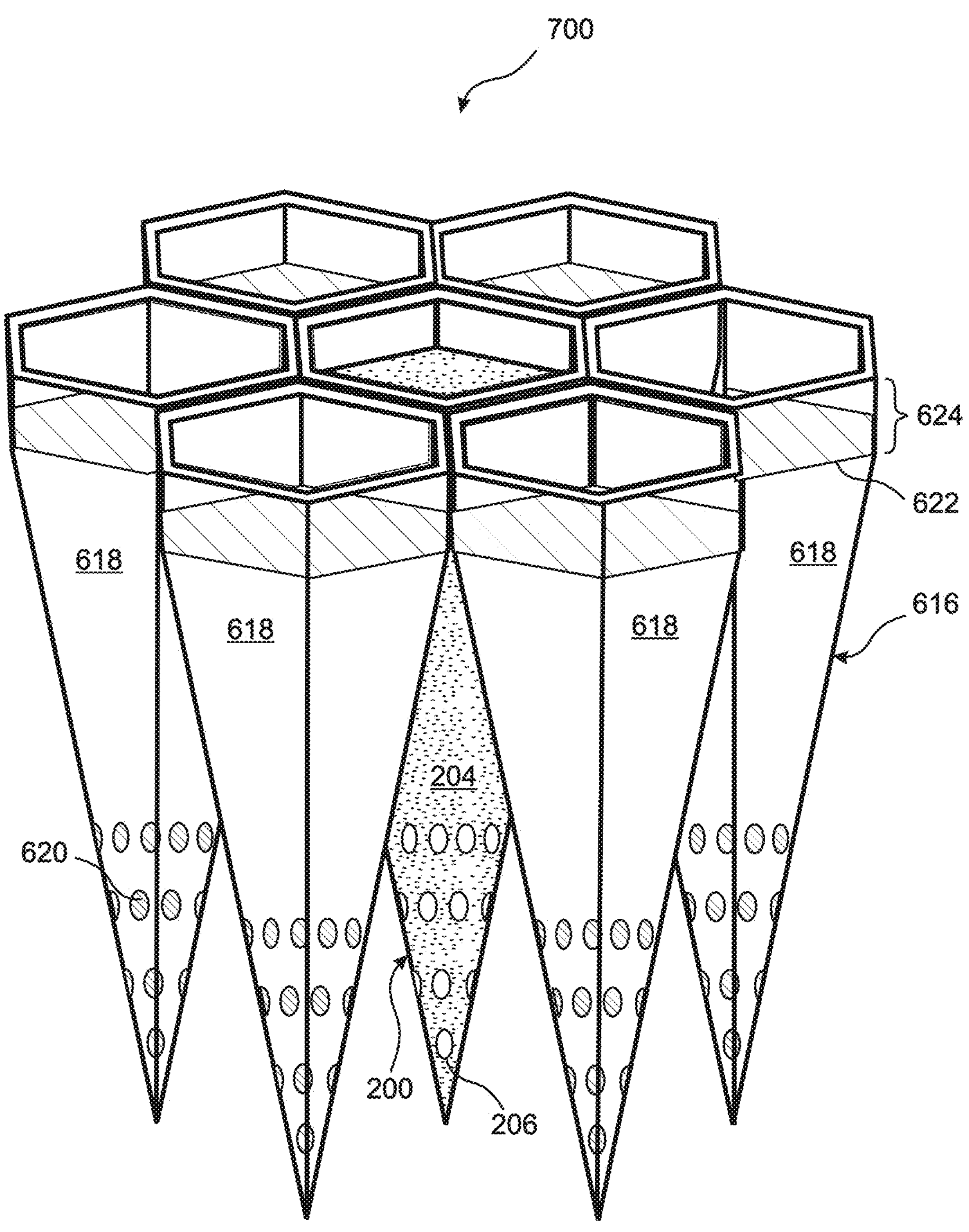
FIG. 7B is a side perspective view of the embodiment of FIG. 2D.

FIG. 7A is a top view of an embodiment in which the projectile cluster 700 includes a seeding tapered projectile 202 that is hexagonal in cross-section, and is surrounded by six hydrating tapered projectiles 616. FIG. 7B is a perspective side view of the embodiment of FIG. 7A. It can be seen that in this embodiment there is an "attachment" portion 624 at the top of each projectile 200, 616 where the cross-sectional, hexagonal shape does not taper. This allows the attachment portions 624 to abut each other and be directly bonded to each other in the cluster 700.

Figure 8:
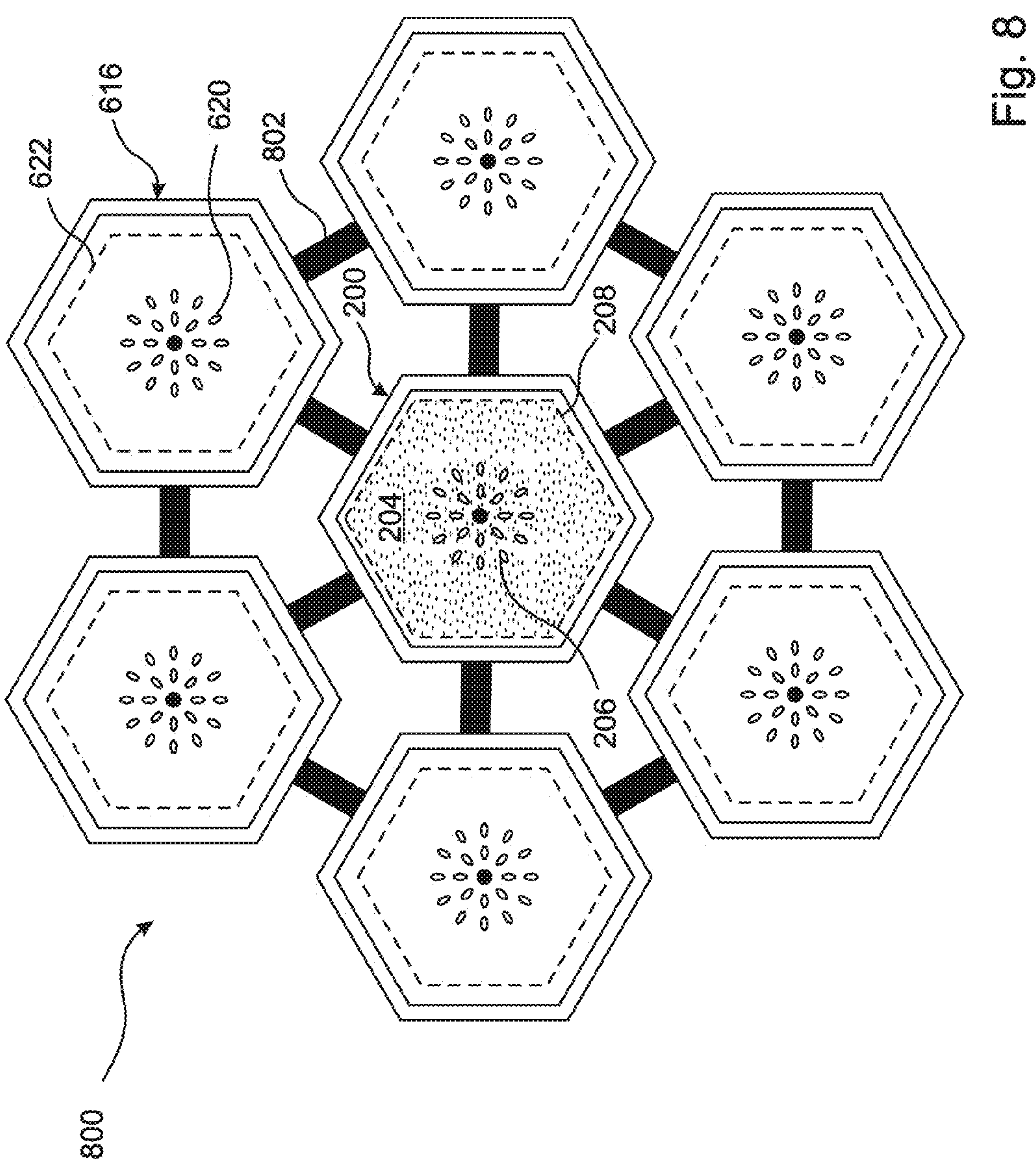
FIG. 8 is a top view of a seeding cluster that comprises a central hexagonal seeding tapered projectile bonded by struts to six hexagonal hydrating tapered projectiles that symmetrically surround the seeding tapered projectile according to an embodiment of the present invention.

In the embodiments of FIGS. 6, 7A, and 7B, the tapered projectiles 200, 616 in the clusters 600, 700 are directly attached to each other. FIG. 8 is a top view similar to FIG. 7A of an embodiment in which the tapered projectiles 200, 616 of the cluster 800 are attached to each other by "struts" 802 which separate the tapered projectiles 200, 616 from each other, and thereby reduce the air resistance of the cluster 800.

Figure 9:
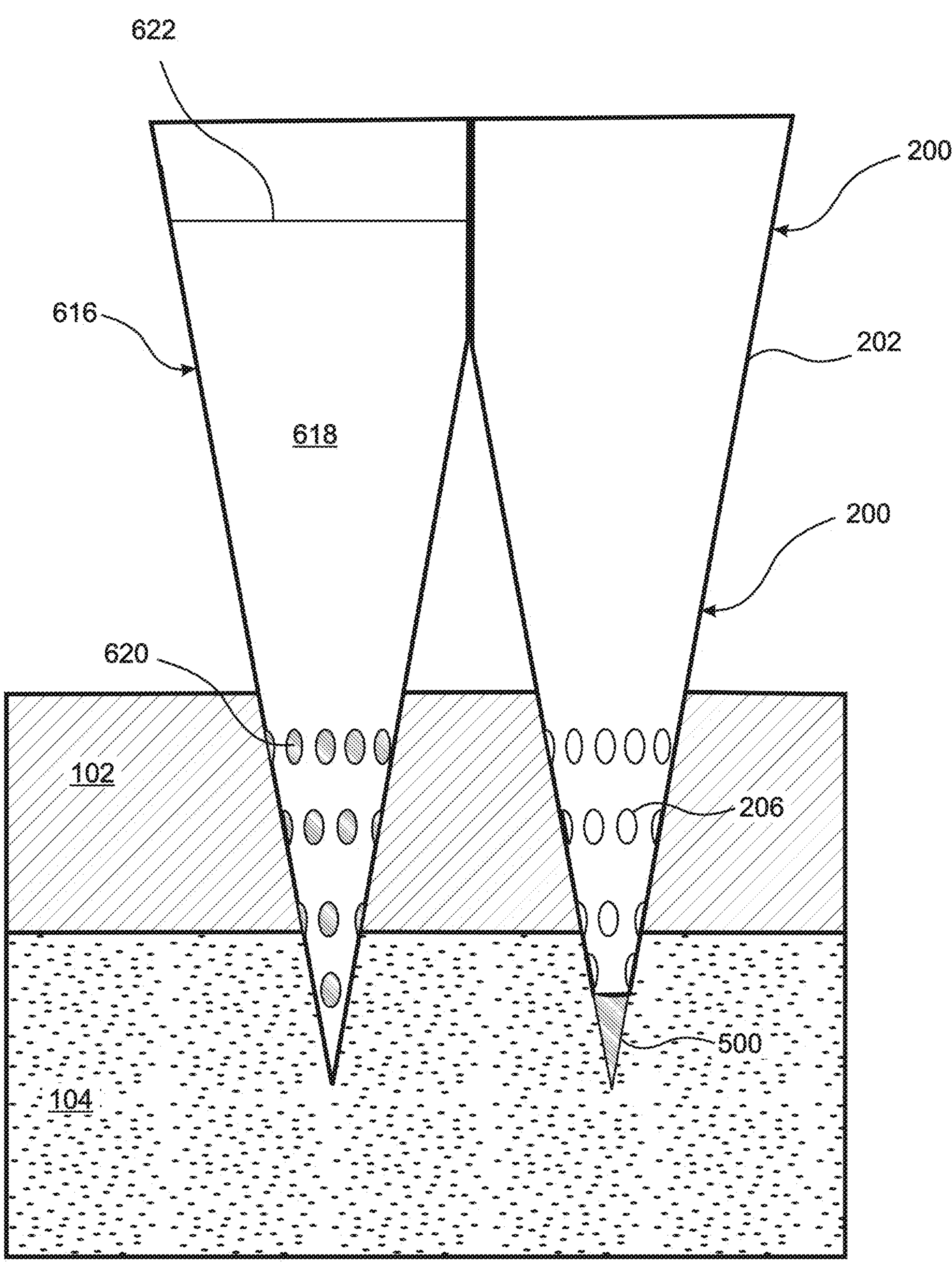
FIG. 9 is a side view of a cluster comprising a seeding tapered projectile directly bonded to a hydrating tapered projectile, wherein the projectiles are shown penetrating through a hydrophobic layer of underlying ground immediately after impact therewith, according to an embodiment of the present invention.

With reference to the sectional view of FIG. 9, the seeding tapered projectile 200, together with any hydrating tapered projectiles 616 that accompany the seeding tapered projectile 200, impact the ground 102, 104 in a substantially vertical orientation, and penetrate into the underlying surface 102 sufficiently far to anchor the tapered projectile 200 to the ground 102, 104, such that it remains vertical. A "pilot hole" is thereby provided for the seeds, seedlings, or saplings, even if the ground 102, 104 is hard-packed or otherwise difficult to penetrate. If a hydrophobic layer 102 is present, the projectiles 200, 616 penetrate through the hydrophobic layer 102 into the underlying soil 104. In the illustrated embodiment, the seeding tapered projectile 200 includes a water-soluble weighted tip 500 which, upon dissolving, provides an opening through which the seeds, seedlings, and/or saplings can extend their roots upon exposure to moisture.

Figure 10A:
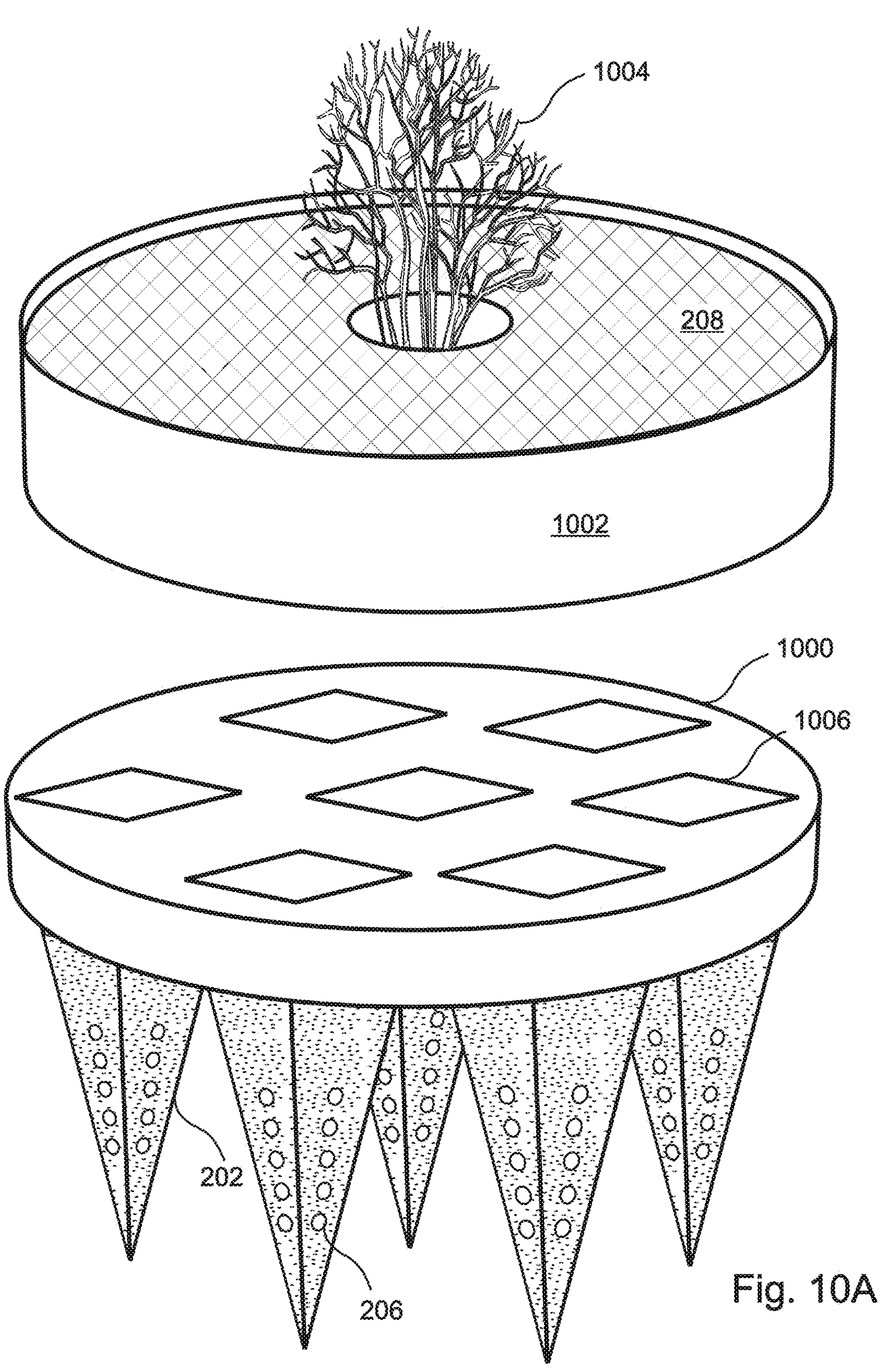
FIG. 10A is a partially exploded perspective view of a seed planting assembly comprising a frame and seed chamber that can allow one or more seedlings or saplings to extend roots simultaneously through a plurality of tapered shells according to an embodiment of the present invention.

With reference to FIG. 10A, in various embodiments a seed planting assembly comprises a plurality of tapered shells 202 mounted such that they all extend downward from a common frame 1000, where the tops of the tapered shells 202 extend to openings 1006 in the common frame 1000. In these embodiments, the tapered shells 202 can be empty, or can be filled with any material or mixture of materials, such as sand, gravel, soil, SAPs, and fertilizer, that are conducive to the growth of vegetation. However, in some of these embodiments the tapered shells 202 do not contain seeds, seedlings, or saplings. Instead, in these embodiments a single seed, seedling, or sapling 1004, or a plurality of seeds, seedlings, and/or saplings, are included in a seed and soil mixture provided in an upper chamber 1002 that extends upward from the frame 1000. In FIG. 10A, the upper chamber 1002 is shown positioned above the frame 1000, so that the relationship between the frame 1000 and the upper chamber 1002 can be more clearly discerned. The weight of this seed planting assembly is sufficient to cause all of the tapered shells 202 to penetrate through the hydrophobic layer 102, due to gravity and/or ballistic propulsion.

Figure 10B:
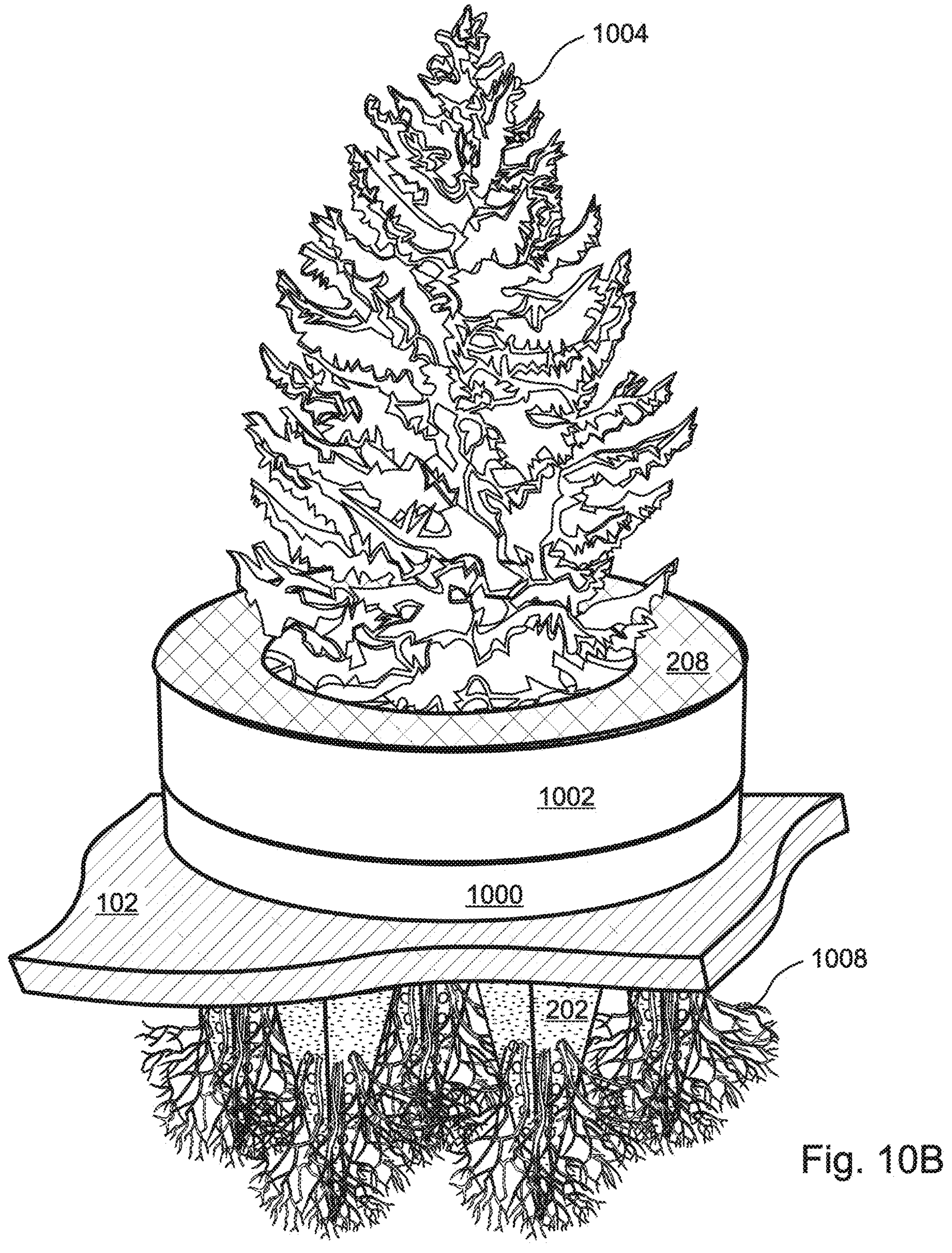
FIG. 10B is a perspective view of the frame and seed chamber of FIG. 10A, shown after a single sapling has burst through the lid of the seed chamber and extended roots through all of the tapered shells.

With reference to FIG. 10B, these embodiments can enable a larger plant 1004 to be established, such as a large sapling 1004 that is intended to replace a burned tree of the forest, because the roots 1008 of the plant 1004 can extend simultaneously through all of the plurality of tapered shells 202, thereby establishing a larger root system 1008 than might be possible for a plant that is germinated within a single tapered shell 202. Note that in FIGS. 10A and 10B, the upper screen 208 is frangible, and has been penetrated by the growing sapling or other plant 1004. In embodiments, hydrating tapered shells 616, similar to the hydrating tapered projectiles described above, extend downward from the frame 1000, in addition to, or in lieu of, the seeding devices 200.

Figure 11A:
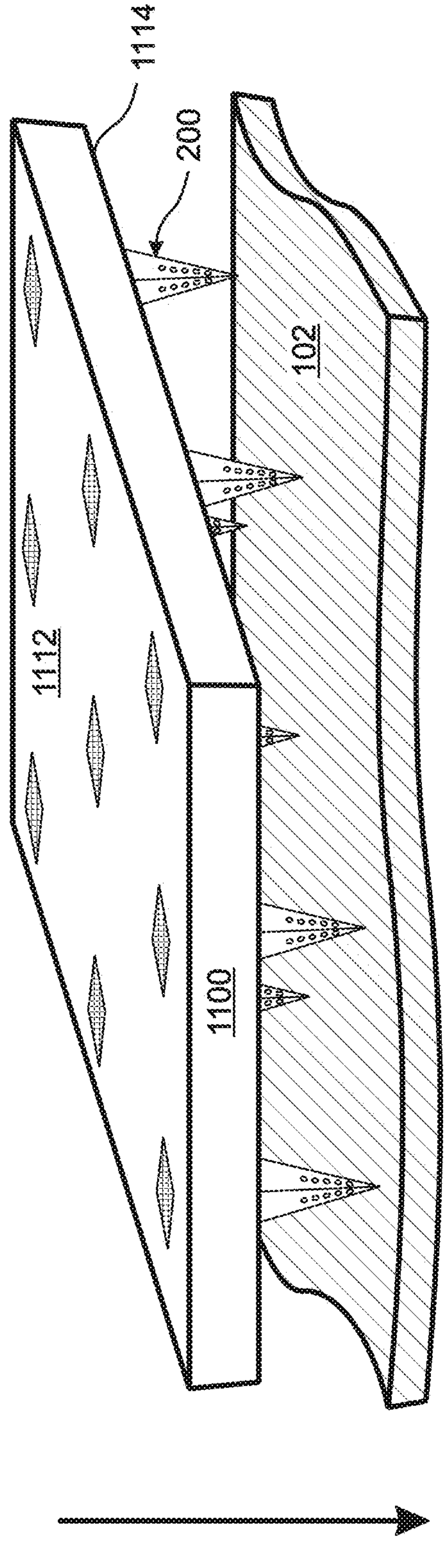
FIG. 11A is a perspective view of a tray to which a plurality of seed planting devices according to FIG. 11A are mounted for manual, simultaneous deployment through the hydrophobic layer.
Figures 11B, 11C:
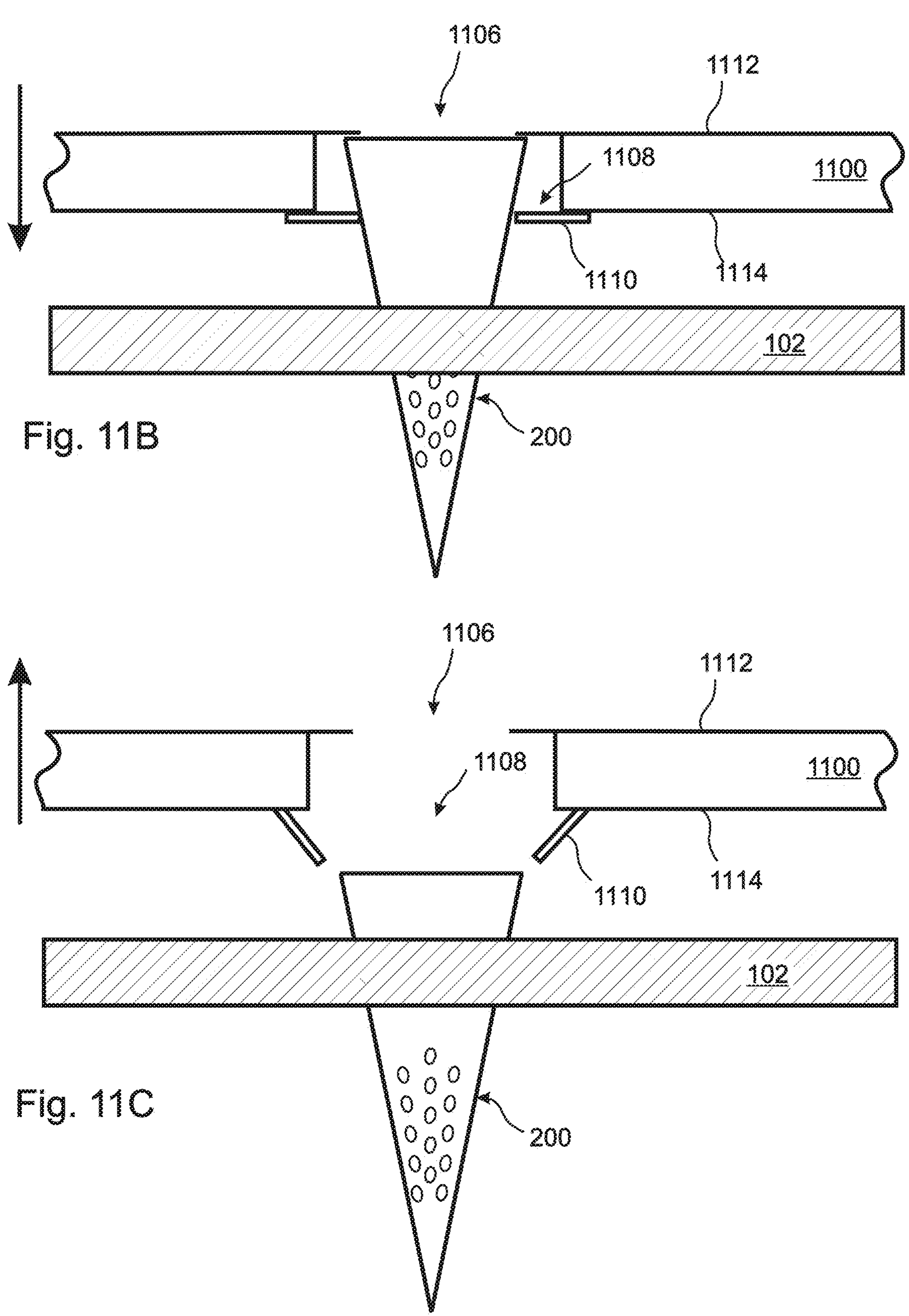
FIG. 11B is a cross-sectional view of one of the seed planting devices of FIG. 11A illustrating a structure that is able to retain the seed planting devices in the tray before deployment, and release them after deployment.
FIG. 11C is a cross-sectional view of the seed planting device and retaining structure of FIG. 11B, illustrating release of the seed planting device from the tray after deployment of the seed planting device.

With reference to FIG. 11A, in other embodiments of the disclosed method, the seed planting devices 200 are pressed into the soil 102 by personnel on the ground. As is illustrated in FIG. 11B, in some of these embodiments a plurality of the seed planting devices 200 are mounted to a rigid tray 1100, such that the seed planting devices 200 extend below the tray 1100. By placing the tray 1100 with seed planting devices 200 onto the ground 102, 104, such that the points of the tapered shells 202 rest on the ground 102, 104 and support the tray 1100, all of the seed planting devices 200 can be simultaneously pressed onto the soil 102, 104, for example by stepping on the tray 1100. In embodiments, hydrating shells 616, as described above, also extend downward from the shell 1100.

With reference to FIG. 11B, in the illustrated embodiment the tray 1100 has a top 1112 and a bottom 1114 that are penetrated by concentric, overlapping holes 1106, 1108, wherein the upper holes 1106 in the top 1112 are smaller in diameter than the tops of the tapered shells 202, thereby ensuring that the seed planting devices 200, and in embodiments the hydrating shells 616, will be pushed downward by the tray 1104 into the soil when the tray 1104 is pressed downward.

The lower holes 1108 formed in the bottom 1114 of the tray 1100 are larger in diameter than the tops of the tapered shells 202. Before deployment of the seed planting devices 200, they are preventing from falling out through the larger holes 1108 by frangible gaskets 1110, made for example from cardboard, that are sufficiently strong to keep the seed planting devices 200 from falling through the larger holes 1108 solely due to gravity. With reference to FIG. 11C, the frangible gaskets 1110 are configured to give way and allow the seed planting devices 200 to pass through the larger holes 1108 when the tray 1100 is lifted up and away from the ground 102 after the seed planting devices 200 have been pressed into the ground 102, 104, thereby allowing the seed planting devices 200 to remain behind in the ground 102. The frangible gaskets 1110 can be attached to the bottom

1114 of the tray 1104 by any convenient means, such as by rivets or screws, or by an adhesive.

In embodiments, the seed planting devices 200, the hydrating tapered projectiles 616 (if present), and/or other components of the present invention are made from one or more biodegradable materials, such as from AshCrete™ (a concrete alternative comprising a mixture of fly ash, borate, bottom ash, and a chlorine compound), hempcrete clay, Timbercrete™ (a masonry product containing a blend of cellulose, cement, sand, and binders), bamboo, recycled wood, and/or other recycled materials, so that after the danger of mudslides has abated, the seed planting devices 200 and hydrating tapered projectiles or shells 616 can partially or fully biodegrade and blend into the soil.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A seed planting cluster comprising:

a hollow seeding tapered projectile having a top, a bottom, and a side, the seeding tapered projectile comprising a tapered shell extending downward along a vertical length thereof from a proximal top to a distal bottom, wherein a horizontal, cross-sectional area of the top is larger than a horizontal, cross-sectional area of the bottom;

at least one seeding hole penetrating the tapered shell proximate the bottom thereof;

one or more seeds, seedlings, and/or saplings contained within the tapered shell;

a hollow hydrating tapered projectile fixed to the seeding tapered projectile, a horizontal, cross-sectional area of a top of the hydrating tapered projectile being larger than a horizontal, cross-sectional area of a bottom of the hydrating tapered projectile;

hydrating water contained within the hydrating tapered projectile; and at least one hydrating hole proximate a bottom of the hydrating tapered projectile, each of the hydrating holes being covered by a water-soluble or frangible hydrating hole cover;

the seed planting cluster being configured such that, upon an impact of the seed planting cluster with underlying ground, the bottoms of the seeding and hydrating tapered projectiles are inserted into the underlying ground, each of the hydrating holes is dissolved or ruptured, the hydrating water is released into the underlying ground, and the seeds, seedlings, and/or saplings are exposed to the hydrating water, thereby causing the seeds, seedlings, and/or saplings to extend roots into soil beneath the seeding tapered projectile.

2. The seed planting cluster of claim 1, wherein the hydrating tapered projectile is directly bonded to the seeding tapered projectile.

3. The seed planting cluster of claim 1, wherein the hydrating tapered projectile is bonded to the seeding tapered projectile by at least one strut.

4. The seed planting cluster of claim 1, wherein the hydrating tapered projectile further contains fertilizer.

5. The seed planting cluster of claim 1, wherein at least some of the hydrating water that is contained within the hydrating tapered projectile is absorbed into a super-absorbent polymer (SAP).

6. The seed planting cluster of claim 1, wherein the hydrating hole cover comprises gelatin.

7. The seed planting cluster of claim 1, wherein the hydrating tapered projectile is included in a plurality of hydrating tapered projectiles, the seeding tapered projectile being centrally located among the plurality of hydrating tapered projectiles.

8. The seed planting cluster of claim 1, wherein the seeding tapered projectile further comprises a porous or perforated lid fixed within the tapered shell above said one or more seeds, seedlings, and/or saplings.

9. The seed planting cluster of claim 1, wherein the seeding tapered projectile further comprises a water-filled reservoir contained between frangible, water impermeable barriers and located within the tapered shell above the one or more seeds, seedlings, and/or saplings, the water impermeable barriers being configured to fracture upon energetic impact of the seeding tapered projectile with a forest floor, thereby allowing the water from the reservoir to flow downward from the reservoir to the one or more seeds, seedlings, and/or saplings.

10. The seed planting cluster of claim 1, wherein the bottom of the tapered shell of the seeding tapered projectile terminates in a point.

11. The seed planting cluster of claim 1, wherein the bottom of the tapered shell of the seeding tapered projectile terminates in one of the seeding holes.

12. The seed planting cluster of claim 1, wherein at least one of the seeding holes penetrates a side of the tapered shell of the seeding tapered projectile proximate the bottom thereof.

13. The seed planting cluster of claim 1, wherein the tapered shell of the seeding tapered projectile further comprises a weighted and pointed tip.

14. The seed planting cluster of claim 13, wherein the weighted and pointed tip is configured to be pushed away from the bottom of the tapered shell by roots growing downward from new vegetation arising from the seeds, seedlings, and/or saplings, thereby leaving an opening in the bottom of the tapered shell.

15. The seed planting cluster of claim 13, wherein the weighted and pointed tip is configured to at least one of dissolve and biodegrade after the impact of the seed planting cluster with underlying ground.

16. The seed planting cluster of claim 1, wherein at least one of the seeding tapered projectile and the hydrating tapered projectile is biodegradable.

17. A method of planting vegetation in a forest floor after a forest fire that has created a hydrophobic layer on the forest floor, the method comprising:

providing a plurality of seed planting clusters according to claim 1; and dropping or propelling the plurality of seed planting clusters from an aircraft onto the forest floor, such that upon an impact of the seed planting clusters with the forest floor, the bottoms of the seeding and hydrating tapered projectiles are inserted into underlying ground of the forest floor, the hydrating holes are uncovered, the hydrating water is released into the underlying ground, and the seeds, seedlings, and/or saplings are exposed to the hydrating water, thereby causing the seeds, seedlings, and/or saplings to extend roots into the underlying ground.

18. The method of claim 17, wherein the aircraft is one of a piloted helicopter, a remotely controlled winged aircraft, and a remotely controlled hovering drone.

19. The method of claim 17, wherein the impact energy of the seed planting clusters is derived entirely from gravitational acceleration after being released from the aircraft.

20. The method of claim 17, wherein the seed planting clusters are ballistically propelled from the aircraft toward the forest floor.

* * * * *